US012300165B2

(12) United States Patent
Wang

(10) Patent No.: US 12,300,165 B2
(45) Date of Patent: May 13, 2025

(54) PIXEL CIRCUIT AND DRIVE METHOD THEREFOR, AND DISPLAY APPARATUS

(71) Applicant: BOE Technology Group Co., Ltd., Beijing (CN)

(72) Inventor: Li Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/791,532

(22) PCT Filed: Aug. 20, 2021

(86) PCT No.: PCT/CN2021/113872
§ 371 (c)(1),
(2) Date: Feb. 23, 2023

(87) PCT Pub. No.: WO2023/019578
PCT Pub. Date: Feb. 23, 2023

(65) Prior Publication Data

US 2024/0177664 A1 May 30, 2024

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0842* (2013.01);
(Continued)

(58) Field of Classification Search
CPC ............... G09G 3/3233; G09G 3/3266; G09G 2300/0842; G09G 2310/0267;
(Continued)

(56) References Cited

U.S. PATENT DOCUMENTS 11,189,227 B1 * 11/2021 Zhang .................. G09G 3/3233
2012/0038683 A1 2/2012 Park et al.
(Continued)

FOREIGN PATENT DOCUMENTS

CN 107342049 A 11/2017
CN 110223640 A 9/2019
(Continued)

OTHER PUBLICATIONS

Office Action dated Nov. 8, 2024 for Chinese Patent Application No. 202180002226.3 and English Translation.

*Primary Examiner* — Abhishek Sarma
(74) *Attorney, Agent, or Firm* — Ling Wu; Stephen Yang; Ling and Yang Intellectual Property

(57) ABSTRACT

Disclosed is a pixel circuit including a drive sub-circuit, a writing sub-circuit, a first reset sub-circuit, and a light emitting element. The drive sub-circuit is configured to provide a drive current between a first electrode and a second electrode of the drive sub-circuit in response to a control signal of a first node; the writing sub-circuit is configured to write a data voltage signal to the first electrode of the drive sub-circuit in response to a control signal of a first scan signal line; the first reset sub-circuit is configured to reset an anode terminal of the light emitting element in response to a control signal of a second scan signal line; and in a low frequency display mode, an input frequency of the control signal of the first scan signal line is the same as a data refresh frequency.

14 Claims, 28 Drawing Sheets

(52) U.S. Cl.
CPC ............... *G09G 2310/0267* (2013.01); *G09G 2310/061* (2013.01); *G09G 2310/08* (2013.01); *G09G 2320/0233* (2013.01); *G09G 2320/0247* (2013.01); *G09G 2330/021* (2013.01)

(58) Field of Classification Search
CPC ......... G09G 2310/061; G09G 2310/08; G09G 2320/0233; G09G 2320/0247; G09G 2330/021
See application file for complete search history.

(56) References Cited

U.S. PATENT DOCUMENTS

| | | | |
|---|---|---|---|
| 2017/0011685 | A1 | 1/2017 | Jeon |
| 2018/0277037 | A1 | 9/2018 | Lin et al. |
| 2020/0388229 | A1 | 12/2020 | Zhang et al. |
| 2021/0375198 | A1 | 12/2021 | Zhang et al. |
| 2021/0375213 | A1 | 12/2021 | Gao et al. |
| 2022/0358879 | A1 | 11/2022 | Wang et al. |

FOREIGN PATENT DOCUMENTS

| | | | |
|---|---|---|---|
| CN | 110277060 | A | 9/2019 |
| CN | 111179854 | A | 5/2020 |
| CN | 111243528 | A | 6/2020 |
| CN | 111445857 | A | 7/2020 |
| CN | 111489701 | A | 8/2020 |
| CN | 111583866 | A | 8/2020 |
| CN | 111696484 | A | 9/2020 |
| CN | 111754938 | A | 10/2020 |
| CN | 111968574 | A | 11/2020 |
| CN | 112185297 | A | 1/2021 |
| CN | 112365844 | A | 2/2021 |
| CN | 112435622 | A | 3/2021 |
| CN | 112509517 | A | 3/2021 |
| CN | 113012638 | A | 6/2021 |
| CN | 113140179 | A | 7/2021 |
| KR | 10-2017-0006335 | A | 1/2017 |

* cited by examiner

PIXEL CIRCUIT AND DRIVE METHOD THEREFOR, AND DISPLAY APPARATUS

CROSS-REFERENCE TO RELATED APPLICATION

The present application is a U.S. National Phase Entry of International Application No. PCT/CN2021/113872 having an international filing date of Aug. 20, 2021. The entire contents of the above-identified application are hereby incorporated by reference.

TECHNICAL FIELD

Embodiments of the present disclosure relate to, but are not limited to, the field of display technologies, and in particular to a pixel circuit and a drive method therefor, and a display apparatus.

BACKGROUND

An Organic Light Emitting Diode (OLED for short) and a Quantum dot Light Emitting Diode (QLED for short) are active light emitting display devices and have advantages of self-luminescence, a wide viewing angle, a high contrast ratio, low power consumption, an extremely high response speed, lightness and thinness, flexibility, and a low cost, etc. With constant development of display technologies, a flexible display apparatus (Flexible Display) that uses an OLED or a QLED as a light emitting device and performs signal control through a Thin Film Transistor (TFT for short) has become a mainstream product in the field of display at present.

SUMMARY

The following is a summary of subject matters described herein in detail. The summary is not intended to limit the protection scope of claims.

An embodiment of the present disclosure provides a pixel circuit, including a drive sub-circuit, a writing sub-circuit, a first reset sub-circuit, and a light emitting element, wherein: the drive sub-circuit is configured to provide a drive current between a first electrode and a second electrode of the drive sub-circuit in response to a control signal of a first node; the writing sub-circuit is configured to write a data voltage signal to the first electrode of the drive sub-circuit in response to a control signal of a first scan signal line; the first reset sub-circuit is configured to reset an anode terminal of the light emitting element in response to a control signal of a second scan signal line; and in a low frequency display mode, an input frequency of the control signal of the first scan signal line is the same as a data refresh frequency, and an input frequency of the control signal of the second scan signal line is greater than the data refresh frequency.

An embodiment of the present disclosure also provides a display apparatus, which includes any one of the above-mentioned pixel circuits.

An embodiment of the present disclosure also provides a drive method of a pixel circuit, which is used for driving any one of the above-mentioned pixel circuits, and the drive method includes: in a reset stage, resetting, by a first reset sub-circuit, an anode terminal of a light emitting element in response to a control signal of a second scan signal line; in a data writing stage, writing, by a writing sub-circuit, a data voltage signal to a first electrode of a drive sub-circuit in response to a control signal of a first scan signal line; in a light emitting stage, providing, by the drive sub-circuit, a drive current between the first electrode and a second electrode of the drive sub-circuit in response to a control signal of a first node; and in a low frequency display mode, an input frequency of the control signal of the first scan signal line is the same as a data refresh frequency, and an input frequency of the control signal of the second scan signal line is greater than the data refresh frequency.

Other aspects may be comprehended upon reading and understanding drawings and detailed descriptions.

BRIEF DESCRIPTION OF DRAWINGS

The drawings are used for providing further understanding of technical solutions of the present disclosure, constitute a part of the specification and together with the embodiments of the present disclosure, are used for explaining the technical solutions of the present disclosure, but do not constitute a limitation on the technical solutions of the present disclosure. Shapes and sizes of various components in the drawings do not reflect actual scales, and are only intended to schematically illustrate contents of the present disclosure.

FIG. 11C is a schematic diagram of a pattern of a first semiconductor layer in a pixel circuit according to an embodiment of the present disclosure.

DETAILED DESCRIPTION

Figure 1:
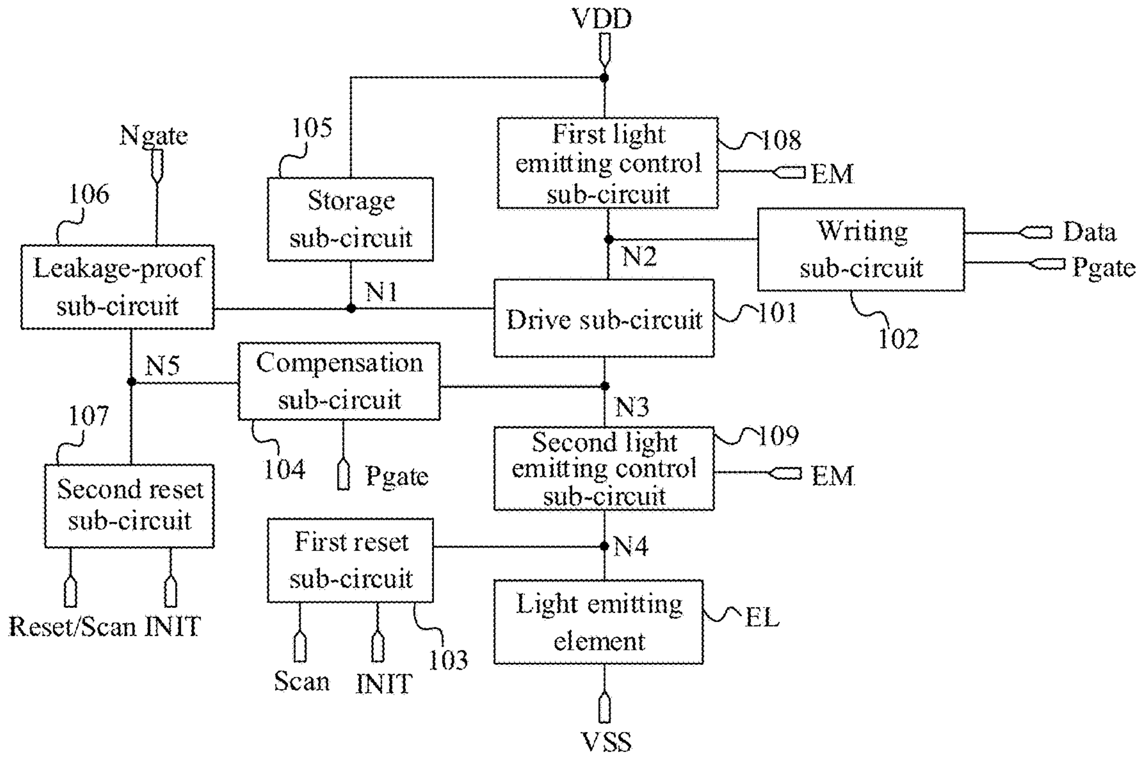
FIG. 1 is a schematic diagram of a structure of a pixel circuit according to an embodiment of the present disclosure.

Embodiments of the present disclosure will be described in detail below with reference to the drawings. It is to be noted that implementation modes may be implemented in multiple different forms. Those of ordinary skills in the art may easily understand such a fact that modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict.

Unless otherwise defined, technical terms or scientific terms publicly used in the embodiments of the present disclosure should have usual meanings understood by those of ordinary skill in the art to which the present disclosure belongs. “First”, “second”, and similar terms used in the embodiments of the present disclosure do not represent any order, quantity, or importance, but are only used for distinguishing different components. “Include”, “contain”, or a similar term means that an element or object appearing before the term covers an element or object listed after the term and equivalent thereof, and another element or object is not excluded.

In the embodiments of the present disclosure, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be the drain electrode, and a second electrode may be the source electrode. Or, the first electrode may be the source electrode, and the second electrode may be the drain electrode. In cases that transistors with opposite polarities are used, a direction of a current is changed during operation of a circuit, or the like, functions of the “source electrode” and the “drain electrode” are sometimes interchanged. Therefore, the “source electrode” and the “drain electrode” are interchanged in the specification.

In this specification, a “connection” includes a case where constitute elements are connected together through an element having some electrical effect. The “element having some electrical effect” is not particularly limited as long as electrical signals may be sent and received between the connected constituent elements. Examples of the “element having some electrical effect” not only include electrodes and wirings, but also include switch elements such as transistors, resistors, inductors, capacitors, and other elements with various functions, etc.

An OLED display apparatus has many advantages such as self-luminescence, a low drive voltage, a high light emitting efficiency, a short response time, and a wide operating temperature range, and are commonly recognized as a most promising display apparatus. OLEDs are divided into Passive Matrix OLEDs (PMOLEDs) and Active Matrix OLEDs (AMOLEDs) according to drive modes. There are multiple pixels arranged in an array in an AMOLED display apparatus, wherein each pixel is driven by a pixel circuit to emit light. For dynamic pictures, display quality may be improved by increasing a refresh frequency of the pictures. For some relatively static pictures, high-frequency refresh is unnecessary, and thus power consumption of a display apparatus may be saved by reducing a refresh frequency of the pictures. In order to make an AMOLED display apparatus compatible with characteristics of high-frequency refresh and low power consumption, the AMOLED display apparatus needs to support dynamic frequency refresh.

At present, Always On Display (AOD) becomes a required function of many portable devices such as smart phones and smart watches. In an AOD mode, information displayed in a picture is time and simple information, and there is no need for high-speed refresh of the picture. Since AOD occupies relatively long use time of a user, low-frequency refresh is conducive to saving power consumption of a device and prolonging use time of a battery.

In a pixel circuit to which a Low Temperature Polycrystalline Oxide (LTPO) technology is applied, a switch Thin Film Transistor (TFT) connected with a control electrode of a Drive Thin Film Transistor (DTFT) is replaced with a low-leakage oxide TFT. Due to a low leakage of the Oxide TFT, brightness change of an OLED is weak for a long time (>0.1 s, or even more than 1 s). Therefore, low-frame-frequency display and a high brightness retention rate may be achieved.

It's assumed that in a low frequency mode, a data refresh frequency of a pixel circuit is 60 Hz, that is, the pixel circuit refreshes and writes data at a frequency of 60 Hz, and keeps it for following time. In order to better eliminate a flicker phenomenon, 60 Hz drive is simulated in an OLED display apparatus, that is, a control signal of a light emitting control signal line EM is refreshed at a frequency of 60 Hz (if there is a Pulse Width Modulation (PWM) dimming setting, a refresh frequency of the control signal of the light emitting control signal line EM may be 240 Hz or higher). However, an actual screen effect at this time is that flicker is still visible to a naked eye. A main reason is that in a refresh stage, since a reset sub-circuit resets an anode terminal of a light emitting element, it takes an amount of time to charge a capacitor of the light emitting element after the control signal of the light emitting control signal line EM is turned on, resulting in a slow increase in brightness of the light emitting element, especially at a low gray scale, it takes about several milli-seconds (ms) to stabilize the brightness. In a holding stage, although the light emitting control signal line EM is periodically black-inserted, the anode terminal of the light emitting element is not reset, so brightness of the light emitting element may quickly reach a stable state. Therefore, in the refresh stage and the holding stage, brightness waveforms of the light emitting element are inconsistent, resulting in screen flicker visible to the naked eye.

In some design solutions of the pixel circuit, a control signal of a first scan signal line is also designed to be driven at a high frequency, that is, the anode terminal of the light emitting element is reset in both the refresh stage and the holding stage, so that time for the brightness of the light emitting element to reach a stable state is consistent in the refresh stage and the holding stage, so that a low frequency component in a brightness waveform is eliminated, and screen flicker is obviously improved. However, after the control signal of the first scan signal line is designed to be driven at the high frequency, not only the anode terminal of the light emitting element is reset at a high frequency, but also a source terminal of a drive transistor is repeatedly written with a data voltage signal and a voltage signal of a first power line, and is hopped and coupled to a gate terminal of the drive transistor by means of parasitic capacitance, thus affecting stability of a current. In addition, in the refresh stage and the holding stage, there will be a difference in potentials of a first electrode of a leakage-proof transistor (in the refresh stage, the potential of the first electrode of the leakage-proof transistor is Vdata+Vth, and in the holding stage, the potential of the first electrode of the leakage-proof transistor is Vdata-Vds, wherein Vdata is a data voltage, Vth is a threshold voltage of the drive transistor, and Vds is a source drain voltage difference of the drive transistor), which will also affect stability of a current.

An embodiment of the present disclosure provides a pixel circuit. FIG. 1 is a schematic diagram of a structure of the pixel circuit according to the embodiment of the present disclosure. As shown in FIG. 1, the pixel circuit includes a drive sub-circuit 101, a writing sub-circuit 102, a first reset sub-circuit 103, and a light emitting element EL.

Among them, the drive sub-circuit 101 is connected with a first node N1, a second node N2, and a third node N3 respectively, and is configured to provide a drive current between a first electrode (i.e., the second node N2) and a second electrode (i.e., the third node N3) of the drive sub-circuit 101 in response to a control signal of the first node N1.

The writing sub-circuit 102 is connected with a first scan signal line Pgate, a data signal line Data, and the second node N2 respectively, and is configured to write a signal of the data signal line Data to the first electrode (i.e., the second node N2) of the drive sub-circuit 101 in response to a control signal of the first scan signal line Pgate.

The first reset sub-circuit 103 is connected with a second scan signal line Scan, an initial signal line INIT, and an anode terminal (i.e., a fourth node N4) of a light emitting element EL respectively, and is configured to reset the anode terminal (i.e., the fourth node N4) of the light emitting element EL in response to a control signal of the second scan signal line Scan.

In a low frequency display mode, a frequency of the control signal of the first scan signal line Pgate is a first frequency, and a frequency of the control signal of the second scan signal line Scan is a second frequency, and the second frequency is greater than the first frequency.

The pixel circuit according to the embodiment of the present disclosure includes a low frequency display mode and a normal display mode, wherein the low frequency display mode includes multiple first display periods, a first display period includes a refresh stage and a holding stage, in the low frequency display mode, the control signal of the first scan signal line Pgate is only input in the refresh stage and not input in the holding stage; the control signal of the second scan signal line Scan is periodically input during an entire first display period (the refresh stage and the holding stage).

In the pixel circuit according to the embodiment of the present disclosure, the writing sub-circuit 102 is connected with the first scan signal line Pgate, the first reset sub-circuit 103 is connected with the second scan signal line Scan, in the low frequency display mode, the frequency of the control signal of the first scan signal line Pgate is the first frequency, the frequency of the control signal of the second scan signal line Scan is the second frequency, and the second frequency is greater than the first frequency, thereby charges on a surface of the anode terminal of the light emitting element EL are eliminated, and time for brightness of the light emitting element EL to reach a stable state is kept consistent in the low frequency display mode, so that screen flicker is obviously improved, and the writing sub-circuit 102 does not repeatedly write a data voltage and a voltage signal of the first power line, ensuring stability of a current.

Figure 2:
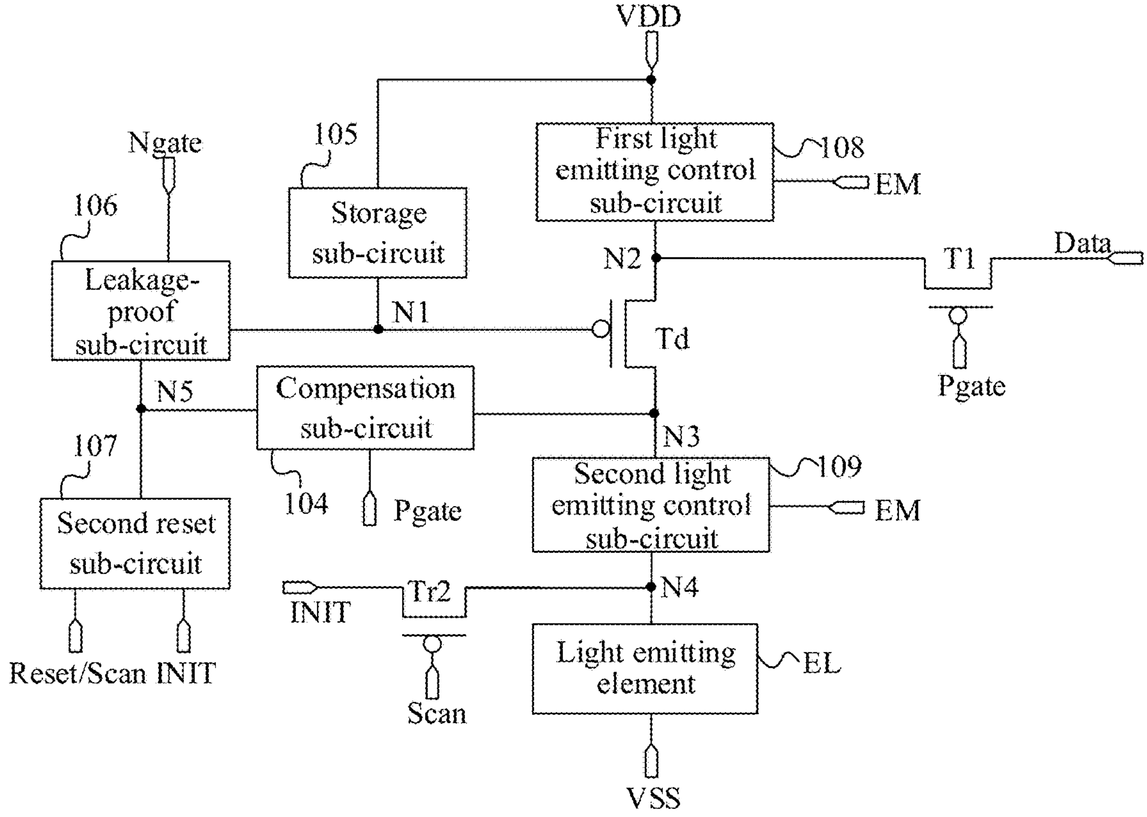
FIG. 2 is an equivalent circuit diagram of a first reset sub-circuit, a drive sub-circuit, and a writing sub-circuit according to an embodiment of the present disclosure.

In some exemplary implementation modes, FIG. 2 is an equivalent circuit diagram of the drive sub-circuit 101, the writing sub-circuit 102, and the first reset sub-circuit 103 according to the embodiment of the present disclosure. As shown in FIG. 2, the drive sub-circuit 101 includes a drive transistor Td, the writing sub-circuit 102 includes a first transistor T1, and the first reset sub-circuit 103 includes a second reset transistor Tr2.

A control electrode of the drive transistor Td is connected with the first node N1, a first electrode of the drive transistor Td is connected with the second node N2, and a second electrode of the drive transistor Td is connected with the third node N3.

A control electrode of the first transistor T1 is connected with the first scan signal line Pgate, a first electrode of the first transistor T1 is connected with the data signal line Data, and a second electrode of the first transistor T1 is connected with the second node N2.

A control electrode of the second reset transistor Tr2 is connected with the second scan signal line Scan, a first electrode of the second reset transistor Tr2 is connected with the initial signal line INIT, and a second electrode of the second reset transistor Tr2 is connected with the anode terminal (i.e., the fourth node N4) of the light emitting element EL.

FIG. 2 illustrates an exemplary structure of the drive sub-circuit 101, the writing sub-circuit 102, and the first reset sub-circuit 103. It is easy for those skilled in the art to understand that implementation modes of the drive sub-circuit 101, the writing sub-circuit 102, and the first reset sub-circuit 103 are not limited thereto as long as their respective functions can be achieved.

In some exemplary implementation modes, as shown in FIG. 1, the pixel circuit further includes a compensation sub-circuit 104, a storage sub-circuit 105, a leakage-proof sub-circuit 106, and a second reset sub-circuit 107.

Among them, the compensation sub-circuit is connected with the first scan signal line Pgate, the third node N3, and a fifth node N5 respectively, and is configured to write a signal of the third node N3 to the fifth node N5 in response to a control signal of the first scan signal line Pgate, and is further configured to compensate the fifth node N5 in response to the control signal of the first scan signal line Pgate.

The leakage-proof sub-circuit 106 is connected with a third scan signal line Ngate, the first node N1, and the fifth node N5 respectively, and is configured to write a signal of the fifth node N5 to the first node N1 in response to a control signal of the third scan signal line Ngate.

The storage sub-circuit 105 is connected with a first power line VDD and the first node N1 respectively, and is configured to store a signal of the first node N1.

The second reset sub-circuit 107 is connected with the initial signal line INIT and the fifth node N5 respectively, and is further connected with the second scan signal line Scan or a reset control signal line Reset, and is configured to write a reset voltage signal of the initial signal line INIT to the fifth node N5 in response to a control signal of the second scan signal line Scan or the reset control signal line Reset.

In the pixel circuit according to the embodiment of the present disclosure, an influence of drift of a threshold voltage of the drive sub-circuit 101 on a drive current of the light emitting element EL is avoided, and uniformity of a displayed image and display quality of a display panel are improved. In addition, in the pixel circuit according to the embodiment of the present disclosure, there are fewer leakage channels, improving a problem of screen flicker at a low frequency and low brightness.

Figure 3:
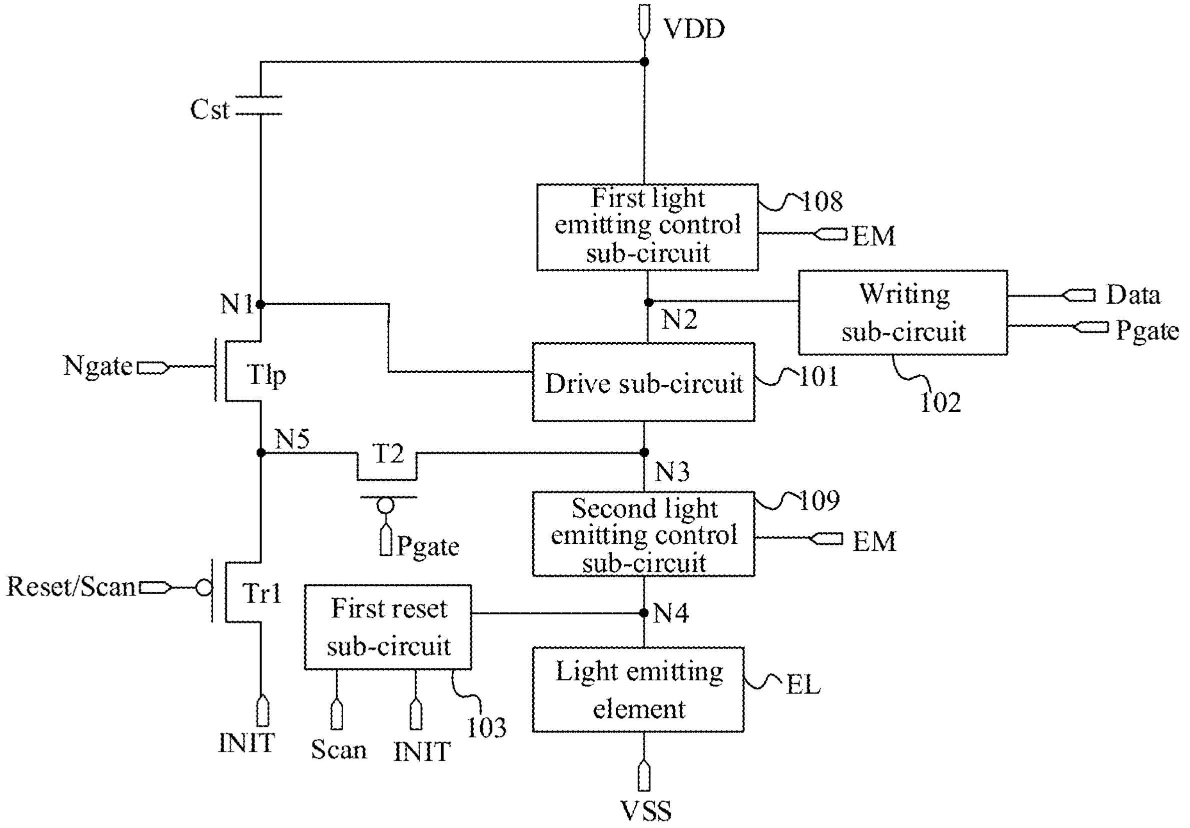
FIG. 3 is an equivalent circuit diagram of a second reset sub-circuit, a compensation sub-circuit, a storage sub-circuit, and a leakage-proof sub-circuit according to an embodiment of the present disclosure.

In some exemplary implementation modes, FIG. 3 is an equivalent circuit diagram of the compensation sub-circuit 104, the storage sub-circuit 105, the leakage-proof sub-circuit 106, and the second reset sub-circuit 107 according to the embodiment of the present disclosure. As shown in FIG. 3, the compensation sub-circuit 104 includes a second transistor T2, the storage sub-circuit 105 includes a first capacitor Cst, the leakage-proof sub-circuit 106 includes a leakage-proof transistor Tlp, and the second reset sub-circuit 107 includes a first reset transistor Tr1.

A control electrode of the second transistor T2 is connected with the first scan signal line Pgate. A first electrode of the second transistor T2 is connected with the third node N3. A second electrode of the second transistor T2 is connected with the fifth node N5.

One terminal of the first capacitor Cst is connected with the first power line VDD, and the other terminal of the first capacitor Cst is connected with the first node N1.

A control electrode of the leakage-proof transistor Tlp is connected with the third scan signal line Ngate. A first electrode of the leakage-proof transistor Tlp is connected with the fifth node N5. A second electrode of the leakage-proof transistor Tlp is connected with the first node N1.

A control electrode of the first reset transistor Tr1 is connected with the second scan signal line Scan or the reset control signal line Reset. A first electrode of the first reset transistor Tr1 is connected with the initial signal line INIT. A second electrode of the first reset transistor Tr1 is connected with the fifth node N5.

FIG. 3 illustrates an exemplary structure of the compensation sub-circuit 104, the storage sub-circuit 105, the leakage-proof sub-circuit 106, and the second reset sub-circuit 107. It is easy for those skilled in the art to understand that implementation modes of the compensation sub-circuit 104, the storage sub-circuit 105, the leakage-proof sub-circuit 106, and the second reset sub-circuit 107 are not limited thereto as long as their respective functions can be achieved.

In some exemplary implementation modes, as shown in FIG. 1, the pixel circuit further includes a first light emitting control sub-circuit 108 and a second light emitting control sub-circuit 109.

The first light emitting control sub-circuit 108 is connected with the first power line VDD, a light emitting control signal line EM, and the second node N2 respectively, and is configured to write a voltage signal of the first power line VDD to the second node N2 under control of a signal of the light emitting control signal line EM.

The second light emitting control sub-circuit 109 is connected with the light emitting control signal line EM, the third node N3, and the fourth node N4 respectively, and is configured to form a path between the third node N3 and the fourth node N4 under control of a signal of the light emitting control signal line EM.

In some exemplary implementation modes, as shown in FIG. 1, one terminal of the light emitting element is connected with the fourth node N4, and the other terminal of the light emitting element is connected with a second power line VSS.

Figure 4:
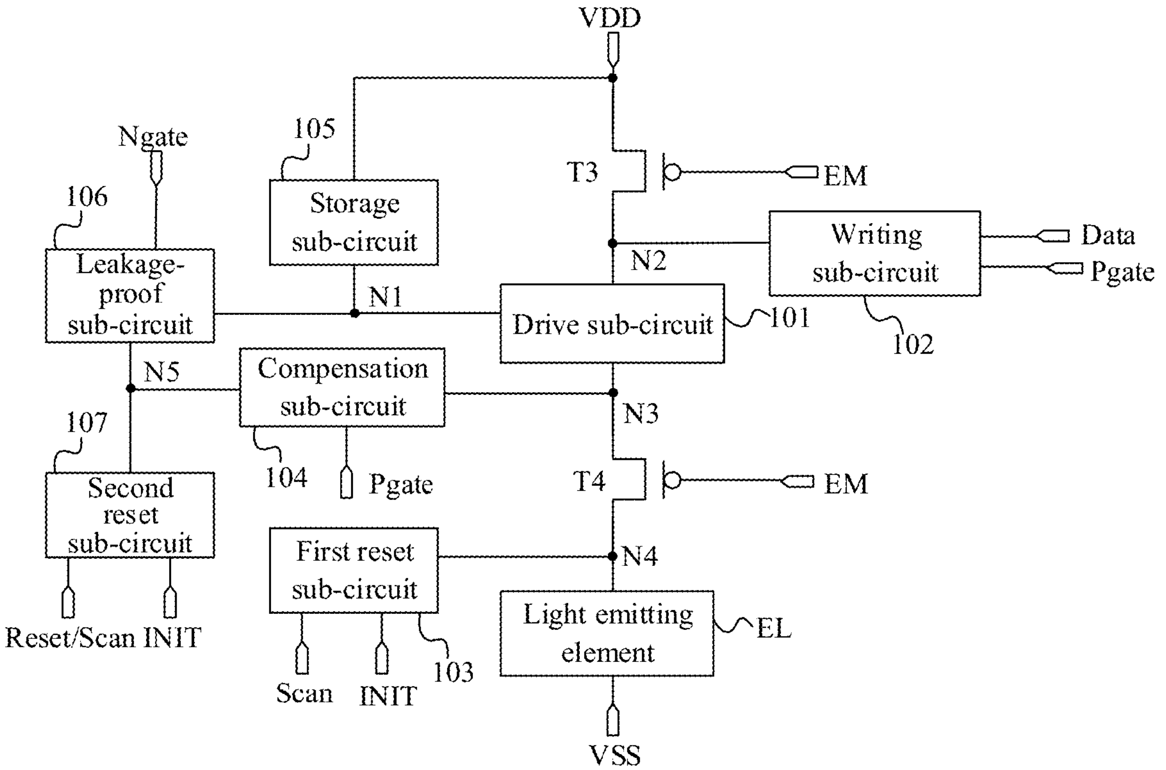
FIG. 4 is an equivalent circuit diagram of a first light emitting control sub-circuit and a second light emitting control sub-circuit according to an embodiment of the present disclosure.

In some exemplary implementation modes, FIG. 4 is an equivalent circuit diagram of the first light emitting control sub-circuit 108 and the second light emitting control sub-circuit 109 according to the embodiment of the present disclosure. As shown in FIG. 4, the first light emitting control sub-circuit includes a third transistor T3, and the second light emitting control sub-circuit includes a fourth transistor T4.

A control electrode of the third transistor T3 is connected with the light emitting control signal line EM, a first electrode of the third transistor T3 is connected with the first power line VDD, and a second electrode of the third transistor T3 is connected the second node N2.

A control electrode of the fourth transistor T4 is connected with the light emitting control signal line EM, a first electrode of the fourth transistor T4 is connected with the third node N3, and a second electrode of the fourth transistor T4 is connected with the anode terminal of the light emitting element EL.

Figure 5:
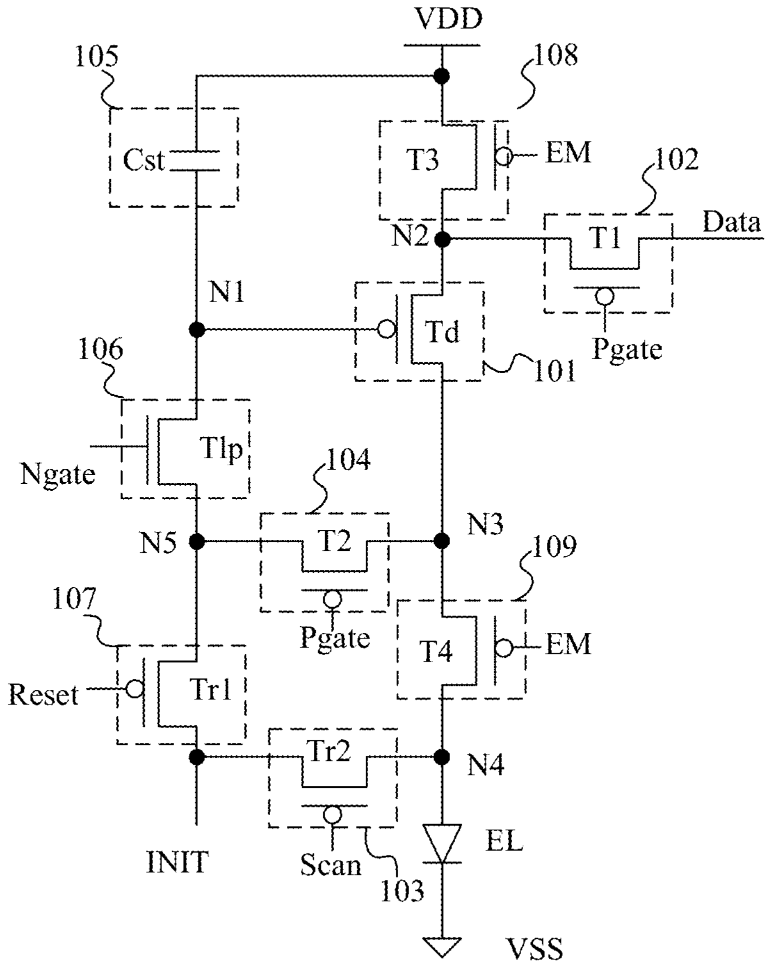
FIG. 5 is a schematic diagram of an equivalent circuit of a pixel circuit according to an embodiment of the present disclosure.

In some exemplary implementation modes, FIG. 5 is an equivalent circuit diagram of the pixel circuit according to the embodiment of the present disclosure. As shown in FIG. 5, in the pixel circuit according to the present disclosure, the drive sub-circuit 101 includes the drive transistor Td, the writing sub-circuit 102 includes the first transistor T1, the first reset sub-circuit 103 includes the second reset transistor Tr2, the compensation sub-circuit 104 includes the second transistor T2, the storage sub-circuit 105 includes the first capacitor Cst, the leakage-proof sub-circuit 106 includes the leakage-proof transistor Tlp, the second reset sub-circuit 107 includes the first reset transistor Tr1, the first light emitting control sub-circuit 108 includes the third transistor T3, and the second light emitting control sub-circuit 109 includes the fourth transistor T4.

A control electrode of the drive transistor Td is connected with the first node N1, a first electrode of the drive transistor Td is connected with the second node N2, and a second electrode of the drive transistor Td is connected with the third node N3.

A control electrode of the first transistor T1 is connected with the first scan signal line Pgate, a first electrode of the first transistor T1 is connected with the data signal line Data, and a second electrode of the first transistor T1 is connected with the second node N2.

A control electrode of the second reset transistor Tr2 is connected with the second scan signal line Scan, a first electrode of the second reset transistor Tr2 is connected with the initial signal line INIT, and a second electrode of the second reset transistor Tr2 is connected with the anode terminal of the light emitting element EL.

A control electrode of the second transistor T2 is connected with the first scan signal terminal Pgate. A first electrode of the second transistor T2 is connected with the third node N3. A second electrode of the second transistor T2 is connected with the fifth node N5.

One terminal of the first capacitor Cst is connected with the first power line VDD, and the other terminal of the first capacitor Cst is connected with the first node N1.

A control electrode of the leakage-proof transistor Tlp is connected with the third scan signal line Ngate. A first electrode of the leakage-proof transistor Tlp is connected with the fifth node N5. A second electrode of the leakage-proof transistor Tlp is connected with the first node N1.

A control electrode of the first reset transistor Tr1 is connected with the second scan signal line Scan. A first electrode of the first reset transistor Tr1 is connected with the initial signal line INIT. A second electrode of the first reset transistor Tr1 is connected with the fifth node N5.

A control electrode of the third transistor T3 is connected with the light emitting control signal line EM, a first electrode of the third transistor T3 is connected with the first power line VDD, and a second electrode of the third transistor T3 is connected the second node N2.

A control electrode of the fourth transistor T4 is connected with the light emitting control signal line EM, a first electrode of the fourth transistor T4 is connected with the third node N3, and a second electrode of the fourth transistor T4 is connected with the anode terminal of the light emitting element EL.

In some exemplary implementation modes, the drive transistor Td, the first reset transistor Tr1, the second reset transistor Tr2, and the first transistor T1 to the fourth transistor T4 may be Low Temperature Poly Silicon (LTPS) Thin Film Transistors (TFTs), and the leakage-proof transistor Tlp is an Indium Gallium Zinc Oxide (IGZO) thin film transistor.

In this embodiment, compared with a low temperature poly silicon thin film transistor, an indium gallium zinc oxide thin film transistor generates less leakage current. Therefore, by setting the leakage-proof transistor Tlp as the indium gallium zinc oxide thin film transistor, generation of leakage current may be significantly reduced. In addition, the first transistor Tr1 and the second transistor T2 do not need to be set as indium gallium zinc oxide thin film transistors, since a size of a low temperature poly silicon thin film transistor is generally smaller than that of an indium gallium zinc oxide thin film transistor, the pixel circuit according to the embodiment of the present disclosure occupies relatively small space, which is beneficial to improve a resolution of a display panel.

In the pixel circuit according to the embodiment of the present disclosure, good switch characteristics of an LTPS TFT and low leakage characteristics of an Oxide TFT are combined, thereby low-frequency drive (1 Hz~ 60 Hz) may be achieved, thus greatly reducing power consumption of a display screen.

In some exemplary implementation modes, a second electrode of the light emitting element EL is connected with the second power line VSS, a signal of the second power line VSS is a low-level signal, and a signal of the first power line VDD is a high-level signal continuously provided. The first scan signal line Pgate is a scan signal line in a pixel circuit of a present display row, and the reset control signal line Reset is a scan signal line in a pixel circuit of a previous display row, that is, for an n-th display row, the first scan signal line Pgate is PGate(n), the reset control signal line Reset is PGate(n−1), the reset control signal line Reset of the present display row and the first scan signal line Pgate in the pixel circuit of the previous display row may be a same signal line, so as to reduce signal lines of the display panel and achieve a narrow bezel of the display panel.

In some exemplary implementation modes, the light emitting element EL may be an Organic light emitting Diode (OLED), including a first electrode (anode), an organic light emitting layer, and a second electrode (cathode) that are stacked.

In some exemplary implementation modes, the first capacitor Cst may be a liquid crystal capacitor composed of a pixel electrode and a common electrode, or may be an equivalent capacitor composed of a storage capacitor and a liquid crystal capacitor composed of a pixel electrode and a common electrode, which is not limited in the present disclosure.

Figure 6:
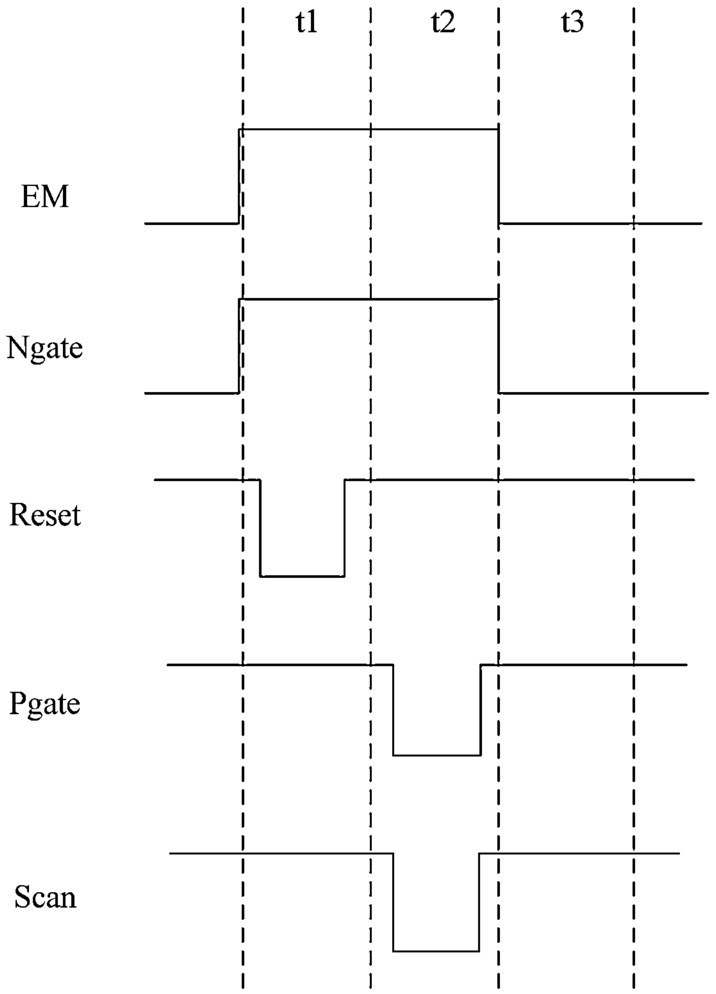
FIG. 6 is a working timing diagram of the pixel circuit shown in FIG. 5 in a normal mode.

FIG. 6 is a working timing diagram of the pixel circuit shown in FIG. 5. An exemplary embodiment of the present disclosure will be described below through a working process of the pixel circuit shown in FIG. 6. The pixel circuit in FIG. 5 includes eight transistors (Tr1, Tr2, Td, T1-T4, and Tlp), one storage capacitor Cst, and nine signal lines (the data signal line Data, the first scan signal line Pgate, the reset control signal line Reset, the third scan signal line Ngate, the second scan signal line Scan, the initial signal line INIT, the first power line VDD, the second power line VSS, and the light emitting control signal line EM). The drive transistor Td, the first reset transistor Tr1, the second reset transistor Tr2, and the first transistor T1 to the fourth transistor T4 are P-type transistors, and the leakage-proof transistor Tlp is an N-type transistor.

In an exemplary implementation mode, the working process of the pixel circuit may include following stages.

In a first stage t1, which is referred to as a reset stage, signals of the first scan signal line Pgate, the second scan signal line Scan, the third scan signal line Ngate, and the light emitting control signal line EM are all high-level signals, and a signal of the reset control signal line Reset is a low-level signal. The high-level signal of the light emitting control signal line EM enables the third transistor T3 and the fourth transistor T4 to be turned off, the high-level signal of the third scan signal line Ngate enables the leakage-proof transistor Tlp to be turned on, and the low-level signal of the reset control signal line Reset enables the first reset transistor Tr1 to be turned on. Therefore, a voltage of the first node N1 is reset to an initial voltage Vinit provided by the initial signal line INIT, then a potential of reset control signal line Reset is set to be high, and the first reset transistor Tr1 is turned off. Since the third transistor T3 and the fourth transistor T4 are turned off, the light emitting element EL does not emit light in this stage.

In a second stage t2, which is referred to as a data writing stage, signals of the first scan signal line Pgate and the second scan signal line Scan are low-level signals, the first transistor T1, the second transistor T2, and the second reset transistor Tr2 are turned on, the data signal line Data outputs a data voltage, and a voltage of the fourth node N4 is reset to be an initial voltage provided by the initial signal line INIT, thereby initialization is completed. In this stage, since the first node N1 is at a low level, the drive transistor Td is turned on. The first transistor T1 and the second transistor T2 are turned on, so that the data voltage output by the data signal line Data is provided to the first node N1 through the turned-on first transistor T1, the second node N2, the turned-on drive transistor Td, the third node N3, the turned-on second transistor T2, and the leakage-proof transistor Tlp, and the storage capacitor C1 is charged with a sum of the data voltage output by the data signal line Data and a threshold voltage of the drive transistor Td. A voltage of a second terminal (the first node N1) of the storage capacitor C1 is Vdata+Vth, wherein Vdata is the data voltage output by the data signal line Data, and Vth is the threshold voltage of the drive transistor Td. A signal of the light emitting control signal line EM is a high-level signal, and the third transistor T3 and the fourth transistor T4 are turned off, thereby ensuring that the light emitting element EL does not emit light.

In a third stage t3, which is referred to as a light emitting stage, signals of the first scan signal line Pgate and the second scan signal line Scan are high-level signals, and signals of the light emitting control signal line EM and the third scan signal line Ngate are all low-level signals. The high-level signal of the second scan signal line Scan enables the second reset transistor Tr2 to be turned off, and the low-level signal of the light emitting control signal line EM enables the third transistor T3 and the fourth transistor T4 to be turned on. A power supply voltage output by the first power line VDD provides a drive voltage to the first electrode (i.e., the fourth node N4) of the light emitting element EL through the turned-on third transistor T3, the drive transistor Td, and the fourth transistor T4 to drive the light emitting element EL to emit light.

In a drive process of the pixel circuit, a drive current flowing through the drive transistor Td (i.e., a drive transistor) is determined by a voltage difference between a gate electrode and a first electrode of the drive transistor Td. Since the voltage of the first node N1 is Vdata+Vth, the drive current of the drive transistor Td is as follows.

$$I=K*(Vgs-Vth)^2=K*[(V\text{data}+Vth-Vdd)-Vth]^2=K*[(V\text{data}-Vdd)]^2$$

Among them, I is the drive current flowing through the drive transistor Td, i.e., a drive current for driving the light emitting element EL. The K is a constant. Vgs is the voltage difference between the gate electrode and the first electrode of the drive transistor. Vth is the threshold voltage of the drive transistor Td. Vdata is the data voltage output by the data signal line Data. Vdd is the power supply voltage output by the first power line VDD.

It may be seen from the above formula that the current I flowing through the light emitting element EL is unrelated to the threshold voltage Vth of the drive transistor Td, so that an influence of the threshold voltage Vth of the drive transistor Td on the current I is eliminated, thus ensuring uniformity of brightness.

Based on the above-mentioned working timing, the pixel circuit eliminates residual positive charges of the light emitting element EL after the light emitting element EL emitted light last time, achieves compensation for a gate voltage of a drive transistor, avoids an influence of drift of a threshold voltage of the drive transistor on a drive current of the light emitting element EL, and improves uniformity of a displayed image and display quality of the display panel.

Figure 7:
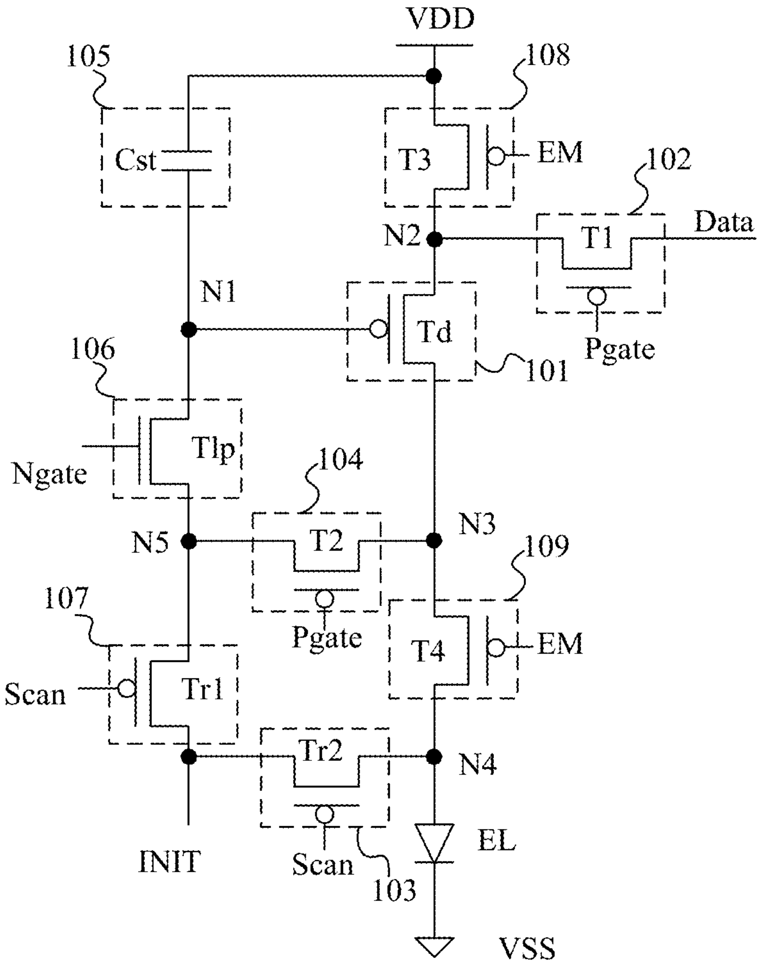
FIG. 7 is a schematic diagram of an equivalent circuit of another pixel circuit according to an embodiment of the present disclosure.

In some exemplary implementation modes, as shown in FIG. 7, in a pixel circuit according to an embodiment of the present disclosure, which is based on the pixel circuit shown in FIG. 5, signals of the second scan signal line Scan and the reset control signal line Reset are combined, that is, a gate of the drive transistor Td (DTFT) and an anode of the light emitting element EL are reset and share the second scan signal line Scan to control outputs, so that one lateral signal line may be omitted on a layout and a space utilization rate is higher.

Figure 8:
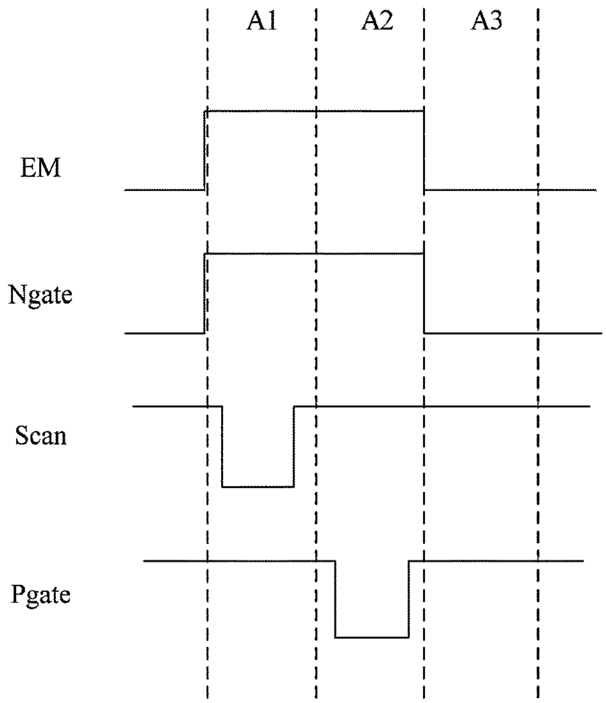
FIG. 8 is a working timing diagram of the pixel circuit shown in FIG. 7 in a normal mode.

FIG. 8 is a working timing diagram of the pixel circuit shown in FIG. 7 in a normal mode. An exemplary embodiment of the present disclosure will be described below through a working process of a pixel circuit shown in FIG. 8. The pixel circuit in FIG. 7 includes eight transistors (Tr1, Tr2, Td, T1-T4, and Tlp), one storage capacitor Cst, and eight signal lines (the data signal line Data, the first scan signal line Pgate, the third scan signal line Ngate, the second scan signal line Scan, the initial signal line INIT, the first power line VDD, the second power line VSS, and the light emitting control signal line EM). The drive transistor Td, the first reset transistor Tr1, the second reset transistor Tr2, and the first transistor T1 to the fourth transistor T4 are P-type transistors, and the leakage-proof transistor Tlp is an N-type transistor.

In an exemplary implementation mode, as shown in FIG. 8, the working process of the pixel circuit may include following stages.

In a first stage A1, which referred to a reset stage, signals of the first scan signal line Pgate, the third scan signal line Ngate, and the light emitting control signal line EM are all high-level signals, and a signal of the second scan signal line Scan is a low-level signal. The high-level signal of the light emitting control signal line EM enables the third transistor T3 and the fourth transistor T4 to be turned off, the high-level signal of the third scan signal line Ngate enables the leakage-proof transistor Tlp to be turned on, and the low-level signal of the second scan signal line Scan enables the first reset transistor Tr1 and the second reset transistor Tr2 to be turned on. Therefore, voltages of the first node N1 and at the fourth node N4 are reset to an initial voltage Vinit provided by the initial signal line INIT, thereby initialization is completed. Then a potential of the second scan signal line Scan is set to be high, and the first reset transistor Tr1 and the second reset transistor Tr2 are turned off. Since the third transistor T3 and the fourth transistor T4 are turned off, the light emitting element EL does not emit light in this stage.

In a second stage A2, which is referred to as a data writing stage, a signal of the first scan signal line Pgate is a low-level signal, signals of the third scan signal line Ngate, the second scan signal line Scan, and the light emitting control signal line EM are all high-level signals. The high-level signal of the second scan signal line Scan enables the second reset transistor Tr2 to be turned off, the low-level signal of the first scan signal line Pgate enables the first transistor T1 and the second transistor T2 to be turned on, and the data signal line Data outputs a data voltage. In this stage, since the first node N1 is at a low level, the drive transistor Td is turned on. The first transistor T1 and the second transistor T2 are turned on, so that the data voltage output by the data signal line Data is provided to the first node N1 through the turned-on first transistor T1, the second node N2, the turned-on drive transistor Td, the third node N3, the turned-on second transistor T2, and the leakage-proof transistor Tlp, and the storage capacitor C1 is charged with a sum of the data voltage output by the data signal line Data and a threshold voltage of the drive transistor Td. A voltage of a second terminal (the first node N1) of the storage capacitor C1 is Vdata+Vth, wherein Vdata is the data voltage output by the data signal line Data, and Vth is the threshold voltage of the drive transistor Td. The signal of the light emitting control signal line EM is the high-level signal, and the third transistor T3 and the fourth transistor T4 are turned off, thus ensuring that the light emitting element EL does not emit light.

In a third stage A3, which is referred to as a light emitting stage, signals of the first scan signal line Pgate and the second scan signal line Scan are high-level signals, and signals of the light emitting control signal line EM and the third scan signal line Ngate are all low-level signals. The low-level signal of the light emitting control signal line EM enables the third transistor T3 and the fourth transistor T4 to be turned on. A power supply voltage output by the first power line VDD provides a drive voltage to the first electrode (i.e., the fourth node N4) of the light emitting element EL through the turned-on third transistor T3, the drive transistor Td, and the fourth transistor T4 to drive the light emitting element EL to emit light.

In the pixel circuit according to the embodiment of the present disclosure, signals of the second scan signal line Scan and the reset control signal line Reset are combined, that is, the gate of the drive transistor Td (DTFT) and the anode of the light emitting element EL are reset and share an output of the second scan signal line Scan, so that one lateral signal line may be omitted on a layout, and a space utilization is higher.

Figure 9:
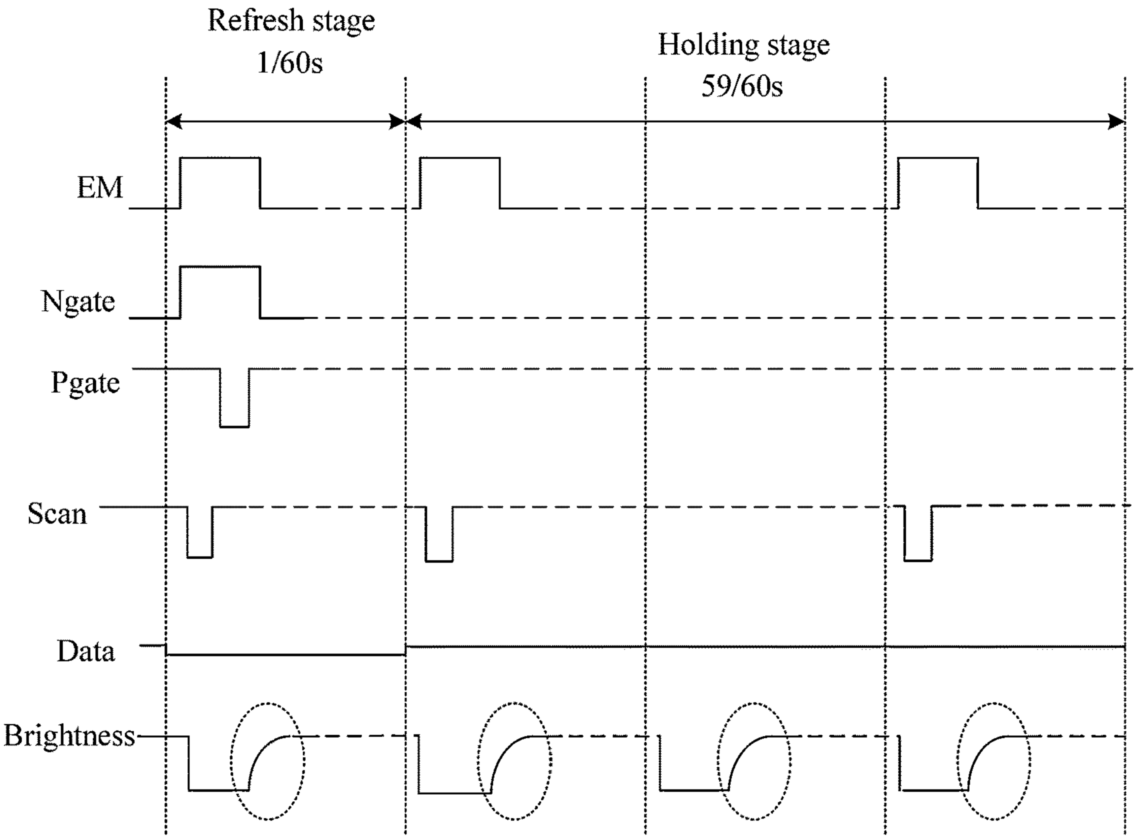
FIG. 9 is a working timing diagram of the pixel circuit shown in FIG. 7 in a low frequency mode.

FIG. 9 is a schematic diagram of control signals of various control signal lines of the pixel circuit shown in FIG. 7 in a low frequency mode. As shown in FIG. 9, exemplarily, it's supposed that a display frequency is 60 Hz, a data refresh frequency of 1 Hz in the low frequency mode is taken as an example, in the low frequency mode, a display period is 1s, wherein a refresh stage is 1/60 s, that is, data may be updated using 1/60 s (a timing in this stage includes the aforementioned reset stage, data writing stage, and light emitting stage), and a holding stage is 59/60 s, that is, data are held in remaining 59/60 s (a timing includes a light emitting stage and an extinguishing stage repeated in turn). In the holding stage, the first scan signal line Pgate and the third scan signal line Ngate does not input a control signal, the second scan signal line Scan and the light emitting control signal line EM periodically input control signals. Using this method, a picture is updated every 1 second, a low frequency component in a brightness waveform is eliminated, and flicker is obviously improved. In addition, by separating a signal of a gate of a transistor for resetting the anode of the light emitting element EL from a control signal of the first scan signal line Pgate, not only stability of a source of the drive transistor Td in the low frequency mode is maintained, but also the anode of the light emitting element EL may be reset at a high frequency.

In some exemplary embodiments, as shown in FIGS. 5 and 6, both the first reset sub-circuit 103 and the second reset sub-circuit 107 are connected with the initial signal line INIT, and the initial signal line INIT provides a reset voltage to the anode terminal of the light emitting element EL and the fifth node N5, respectively.

Figure 10:
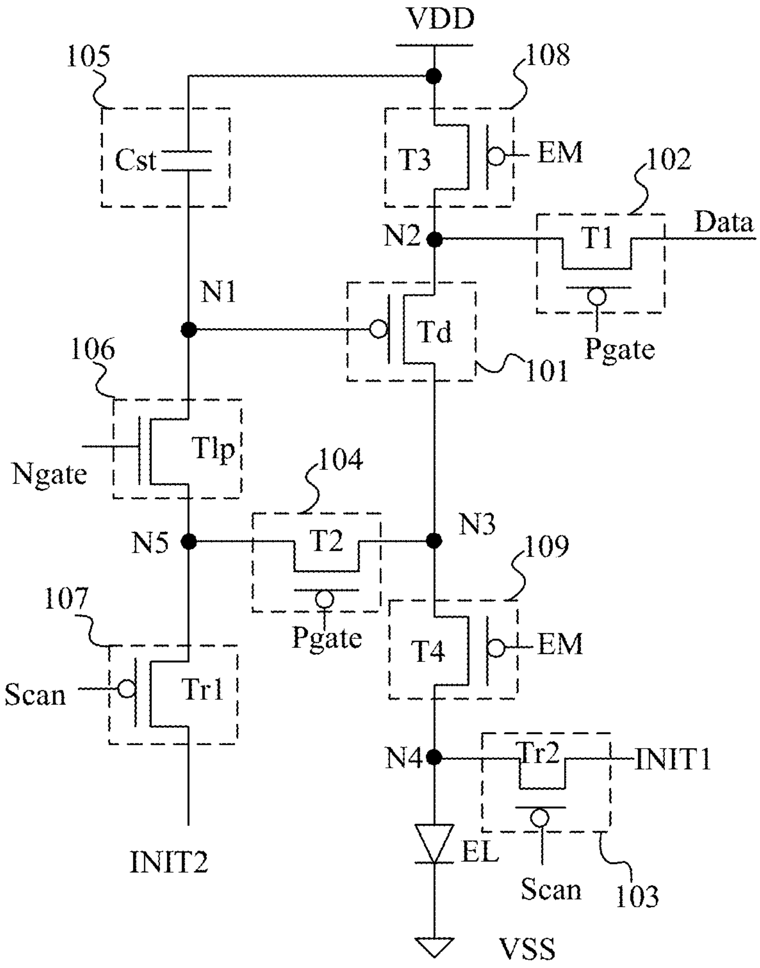
FIG. 10 is a schematic diagram of an equivalent circuit of yet another pixel circuit according to an embodiment of the present disclosure.

In other exemplary implementation modes, as shown in FIG. 10, the initial signal line INIT includes a first initial signal line INIT1 and a second initial signal line INIT2. The first reset sub-circuit 103 is connected with the first initial signal line INIT1, and the second reset sub-circuit 107 is connected with the second initial signal line INIT2. The first initial signal line INIT1 provides a first reset voltage to the anode terminal of the light emitting element EL, and the second initial signal line INIT2 provides a second reset voltage to the fifth node N5.

In the pixel circuit according to the embodiment of the present disclosure, by initializing the fifth node N5 to a signal of the first initial signal line INIT1 and initializing the fourth node N4 to a signal of the second initial signal line INIT2, a reset voltage of the light emitting element EL and a reset voltage of the first node N1 may be adjusted respectively, thereby achieving a better display effect and ameliorating problems such as flicker at a low frequency.

Exemplary description is made below through a preparation process of the pixel circuit. A "patterning process" mentioned in the present disclosure includes coating with a photoresist, mask exposure, development, etching, photoresist stripping, and other treatments for a metal material, an inorganic material, or a transparent conductive material, and includes coating with an organic material, mask exposure, development, and other treatments for an organic material. Deposition may be any one or more of sputtering, evaporation, and chemical vapor deposition. Coating may be any one or more of spray coating, spin coating, and ink-jet printing. Etching may be any one or more of dry etching and wet etching, which is not limited in present disclosure. A "thin film" refers to a layer of thin film made of a material on a base substrate through a process such as deposition and coating. If the "thin film" does not need a patterning process in an entire preparation process, the "thin film" may also be called a "layer". If the "thin film" needs a patterning process in an entire preparation process, it is called a "thin film" before the patterning process, and called a "layer" after the patterning process. The "layer" after the patterning process includes at least one "pattern". "A and B being disposed on a same layer" mentioned in the present disclosure means that A and B are formed simultaneously through a same patterning process, and a "thickness" of a film layer is a dimension of the film layer in a direction perpendicular to a display substrate. In an exemplary embodiment of the present disclosure, "an orthographic projection of B is within a range of an orthographic projection of A" refers to that a boundary of the orthographic projection of B falls within a range of a boundary of the orthographic projection of A, or a boundary of the orthographic projection of A is overlapped with a boundary of the orthographic projection of B. "An orthographic projection of A containing an orthographic projection of B" refers to that a boundary of the orthographic projection of B falls within a range of a boundary of the orthographic projection of A, or a boundary of the orthographic projection of A is overlapped with a boundary of the orthographic projection of B.

In an exemplary implementation mode, the preparation process of the pixel circuit may include following operations.

(11) A pattern of a light shielding layer is formed. In an exemplary embodiment, forming the pattern of the light shielding layer may include: depositing a light shielding thin film on a base substrate (BS); coating a layer of photoresist on the light shielding thin film, exposing and developing the photoresist with a single tone mask, forming an unexposed region at a position of the pattern of the light shielding layer, remaining photoresist, and forming a fully exposed region at other positions without photoresist to expose the light shielding thin film; etching the light shielding thin film in the fully exposed region and stripping the remaining photoresist to form the pattern of the light shielding layer on the base substrate, as shown in FIG. 11B. Among them, the light shielding thin film may be made of one of metals such as silver (Ag), molybdenum (Mo), aluminum (A1), and copper (Cu), or a composite layer structure of multiple metals, such as Mo/Cu/Mo.

In an exemplary embodiment, as shown in FIG. 11B, the light shielding layer of each sub-pixel may include a first light shielding layer LS01 and a second light shielding layer LS02. The first light shielding layer LS01 extends along a first direction X, the second light shielding layer LS02 extends along a second direction Y, wherein the first direction X intersects with the second direction Y.

In an exemplary embodiment, the first light shielding layer LS01 and the second light shielding layer LS02 may be mutually connected to be an integral structure.

(12) A pattern of a first semiconductor layer is formed. In an exemplary embodiment, forming the pattern of the first semiconductor layer may include: sequentially depositing a first insulation thin film and a first active layer thin film on the base substrate on which aforementioned pattern is formed; coating a layer of photoresist on the first active layer thin film, exposing and developing the photoresist with a single tone mask, forming an unexposed region at a position of a pattern of a first active layer, remaining photoresist, and forming a fully exposed region at other positions without photoresist; and etching the first active layer thin film in the fully exposed region and stripping the remaining photoresist to form patterns of a first insulation layer and the first semiconductor layer. Among them, the first insulation layer is used for blocking an influence of ions in the base substrate on a thin film transistor, the first insulation layer may be made of Silicon Nitride (SiNx), Silicon Oxide (SiOx), or a composite thin film of SiNx/SiOx, and the first active layer thin film may be made of a silicon material, which includes amorphous silicon and poly silicon. The first active layer film may also be made of amorphous silicon (a-Si), and poly silicon is formed by means of crystallization or laser annealing, etc., as shown in FIG. 11C.

As shown in FIG. 11C, the first semiconductor layer of each sub-pixel may include a first active layer ACT1 of the first transistor T1, a second active layer ACT2 of the second transistor T2, a third active layer ACT3 of the third transistor T3, a fourth active layer ACT4 of the fourth transistor T4, a drive active layer ACTd of the drive transistor Td, a first reset active layer ACTr1 of the first reset transistor Tr1, and a second reset active layer ACTr2 of the second reset transistor Tr2. The first active layer ACT1, the second active layer ACT2, the third active layer ACT3, the fourth active layer ACT4, the drive active layer ACTd, the first reset active layer ACTr1, and the second reset active layer ACTr2 are mutually connected to be an integral structure.

In an exemplary embodiment, a shape of the drive active layer ACTd may be a shape of a Chinese character "几", shapes of the first active layer ACT1 and the second active layer ACT2 may be a shape of a "1", and shapes of the third active layer ACT3, the fourth active layer ACT4, the first reset active layer ACTr1, and the second reset active layer ACTr2 may be a shape of an "L".

In an exemplary embodiment, an active layer of each transistor may include a first region, a second region, and a channel region located between the first region and the second region. In an exemplary embodiment, a second region Dr1 of the first reset active layer ACTr1 simultaneously serves as a first region S2 of the second active layer ACT2, that is, the second region Dr1 of the first reset active layer ACTr1 and the first region S2 of the second active layer ACT2 are connected with each other. A first region Sd of the drive active layer ACTd simultaneously serves as a second region D1 of the first active layer ACT1 and a second region D3 of the third active layer ACT3, that is, the first region Sd of the drive active layer ACTd, the second region D1 of the first active layer ACT1, and the second region D3 of the third active layer ACT3 are connected with each other. A second region Dd of the drive active layer ACTd simultaneously serves as both a first region S4 of the fourth active layer ACT4 and a second region D2 of the second active layer ACT2, that is, the second region Dd of the drive active layer ACTd, and the first region S4 of the fourth active layer ACT4, and the second region D2 of the second active layer ACT2 are connected with each other. A second region D4 of the fourth active layer ACT4 simultaneously serves as a second region Dr2 of the second reset active layer ACTr2, that is, the second region D4 of the fourth active layer ACT4 and the second region Dr2 of the second reset active layer ACTr2 are connected with each other. A first region Sr1 of the first reset active layer ACTr1, a first region S1 of the first active layer ACT1, a first region S3 of the third active layer ACT3, and a first region Sr2 of the second reset active layer ACTr2 are separately disposed.

Figure 11A:
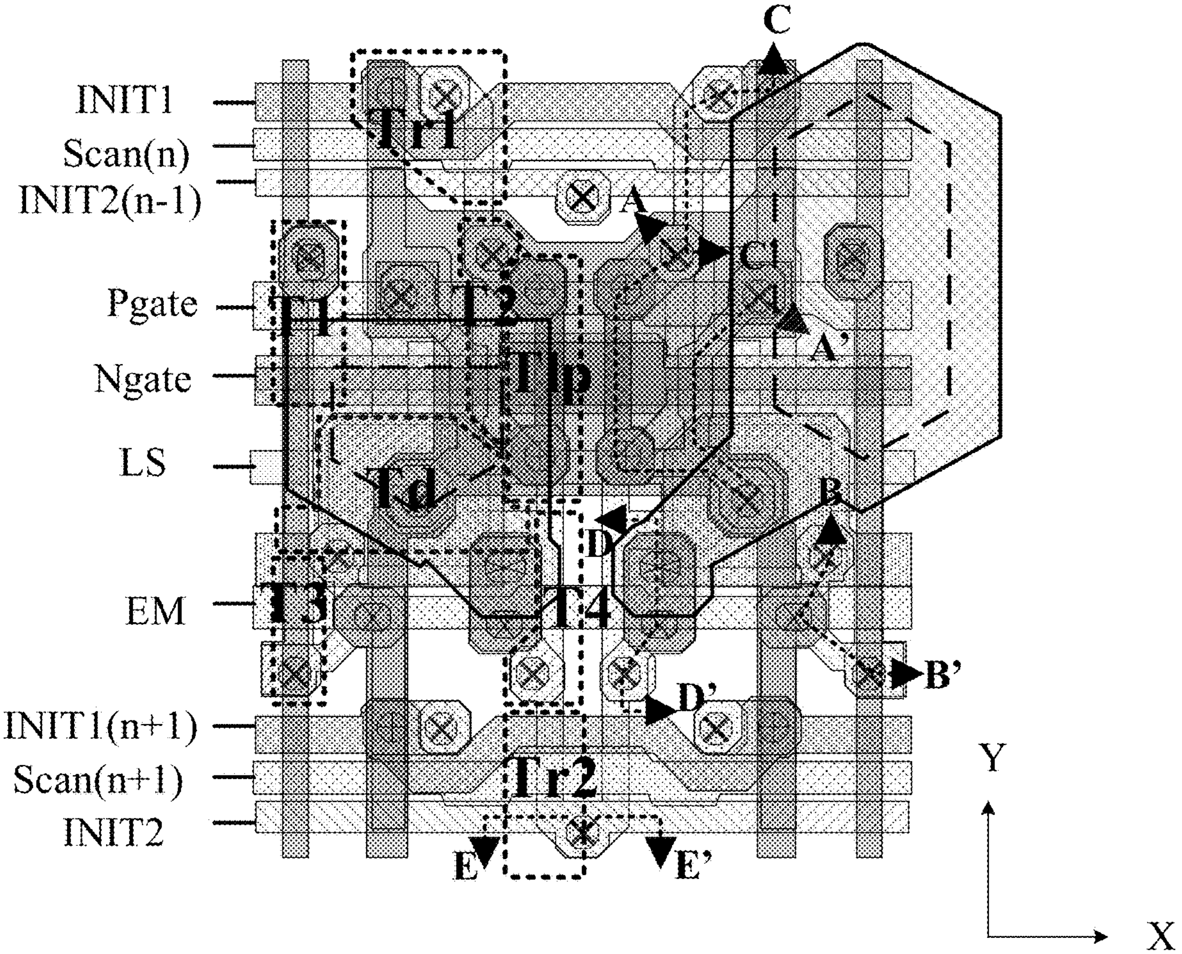
FIG. 11A is a schematic diagram of a planar structure of a pixel circuit according to an embodiment of the present disclosure.
Figure 11B:
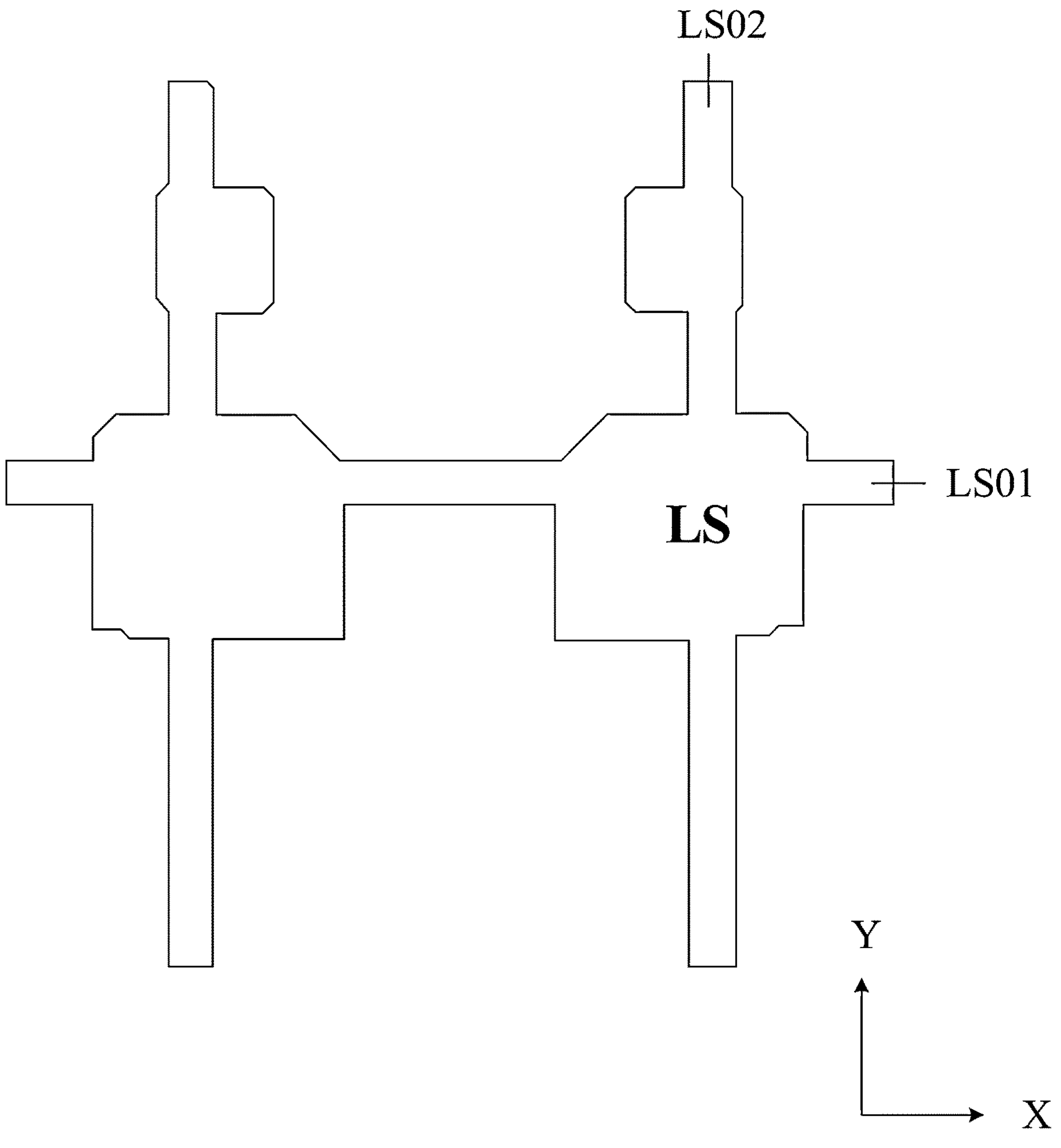
FIG. 11B is a schematic diagram of a pattern of a light shielding layer in a pixel circuit according to an embodiment of the present disclosure.

In conjunction with FIGS. 11A and 11C, in an exemplary embodiment, the first light shielding layer LS01 is provided with a first light shielding protrusion protruding perpendicular to an extension direction of the first light shielding layer LS01, and an orthographic projection of the first light shielding protrusion on the base substrate covers an orthographic projection of the drive active layer ACTd on the base substrate. The second light shielding layer LS02 is provided with a second light shielding protrusion protruding perpendicular to an extension direction of the second light shielding layer LS02, and an orthographic projection of the second light shielding protrusion on the base substrate covers an orthographic projection of the first region S2 of the second active layer ACT2 on the base substrate.

In an exemplary embodiment, the first semiconductor layer may be made of poly silicon (p-Si), that is, the first reset transistor, the second transistor, the drive transistor, the first transistor, the third transistor, the fourth transistor, and the second reset transistor are LTPS thin film transistors.

After this process, the display substrate includes the first insulation layer disposed on the base substrate and the first semiconductor layer disposed on the first insulation layer. The first semiconductor layer may include active layers of multiple transistors.

Figure 11D:
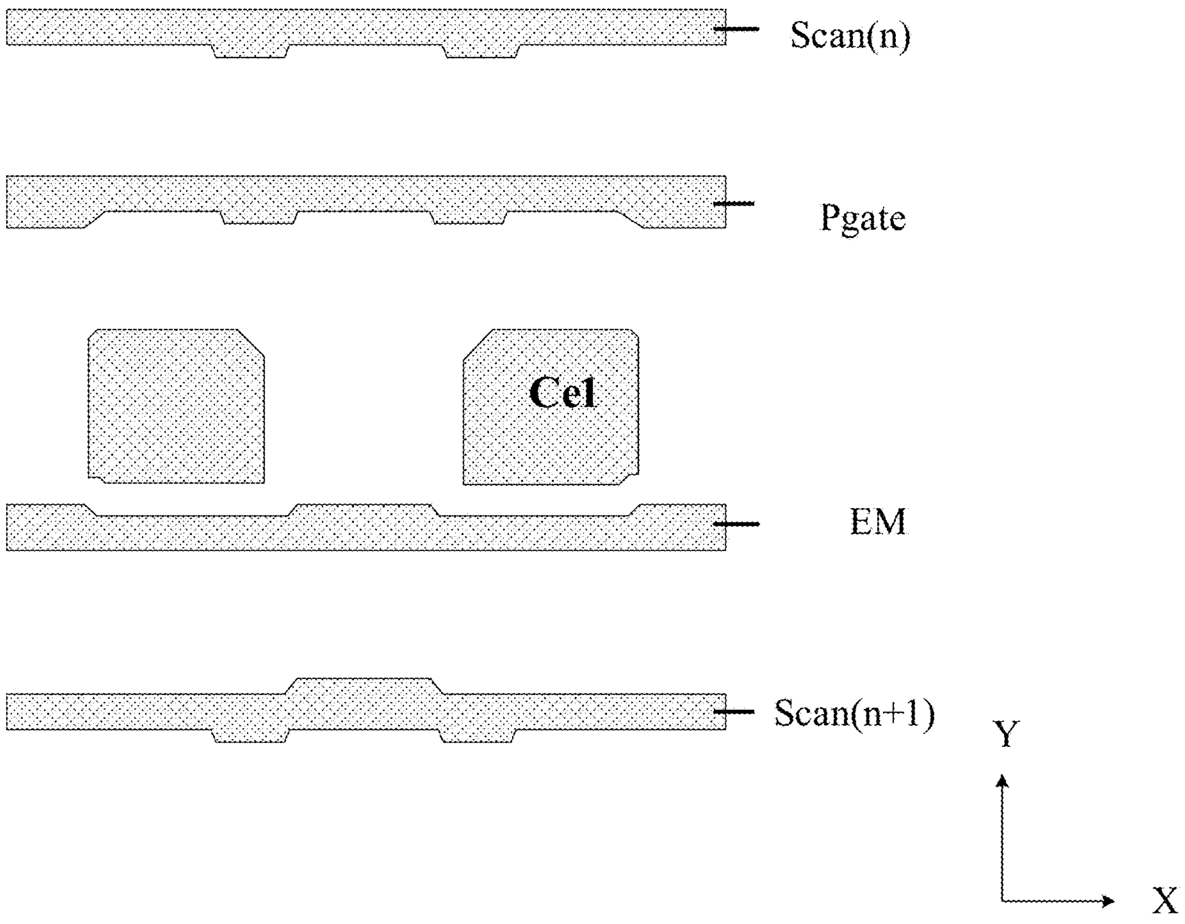
FIG. 11D is a schematic diagram of a pattern of a first conductive layer in a pixel circuit according to an embodiment of the present disclosure.

(13) A pattern of a first conductive layer is formed. In an exemplary embodiment, forming the pattern of the first conductive layer may include: depositing a second insulation thin film and a first metal thin film in sequence on the base substrate on which aforementioned patterns are formed, and patterning the first metal thin film through a patterning process to form a second insulation layer covering the pattern of the first semiconductor layer and the pattern of the first conductive layer disposed on the second insulation layer. The pattern of the first conductive layer at least includes the first scan signal line Pgate, the second scan signal line Scan, the light emitting control signal line EM, and a first electrode plate Ce1 of the first capacitor, as shown in FIG. 11D. In an exemplary embodiment, the first conductive layer may be referred to as a first gate metal (GATE1) layer.

In an exemplary embodiment, the first scan signal line Pgate, the second scan signal line Scan, and the light emitting control signal line EM extend along the first direction X. The second scan signal line Scan is located on a side of the first scan signal line Pgate away from the light emitting control signal line EM, and a first electrode plate Ce1 of the storage capacitor is disposed between the first scan signal line Pgate and the light emitting control signal line EM.

In an exemplary embodiment, the first electrode plate Ce1 may be in a shape of a rectangle and corners of the rectangle may be chamfered. There is a region where an orthographic projection of the first electrode plate Ce1 on the base substrate is overlapped with an orthographic projection of the drive active layer of the drive transistor Td on the base substrate. In an exemplary embodiment, the first electrode plate Ce1 simultaneously serves as the gate electrode of the drive transistor Td, and a region where the drive active layer of the drive transistor Td is overlapped with the first electrode plate Ce1 serves as a channel region of the drive transistor Td. An end of the channel region is connected with a first region of the drive active layer and the other end is connected with a second region of the drive active layer. The second scan signal line Scan is provided with a gate block protruding toward a side of the first scan signal line Pgate. There is a region wherein an orthographic projection of the gate block on the base substrate is overlapped with an orthographic projection of the first reset active layer of the first reset transistor Tr1 on the base substrate. A region where the gate block is overlapped with the first active layer of the first reset transistor Tr1 serves as a gate electrode of the first reset transistor Tr1. A region where the first scan signal line Pgate is overlapped with the second active layer of the second transistor T2 serves as a gate electrode of the second transistor T2. A region where the first scan signal line Pgate is overlapped with the first active layer of the first transistor T1 serves as a gate electrode of the first transistor T1. A region where the first electrode plate Ce1 is overlapped with the drive active layer of the drive transistor Td serves as the gate electrode of the drive transistor Td. A region where the light emitting control signal line EM is overlapped with the third active layer of the third transistor T3 serves as a gate electrode of the third transistor T3. A region where the light emitting control signal line EM is overlapped with the fourth active layer of the fourth transistor T4 serves as a gate electrode of the fourth transistor T4. A region where the second scan signal line Scan is overlapped with the second reset active layer of the second reset transistor Tr2 serves as a gate electrode of the second reset transistor Tr2.

In an exemplary embodiment, after the pattern of the first conductive layer is formed, the first conductive layer may be used as a shield to perform a conductive treatment on the semiconductor layer. The semiconductor layer in a region which is shielded by the first conductive layer, forms channel regions of various transistors, and the semiconductor layer in a region which is not shielded by the first conductive layer, is made to be conductive, that is, first regions and second regions of various active layers are all made to be conductive.

In an exemplary embodiment, in conjunction with FIGS. 11A and 11D, the orthographic projection of the first light shielding protrusion on the base substrate covers the orthographic projection of the first electrode plate Ce1 on the base substrate.

After this process, the display substrate includes the light shielding layer disposed on the base substrate, the first insulation layer disposed on the light shielding layer, the first semiconductor layer disposed on the first insulation layer, the second insulation layer covering the first semiconductor layer, and the first conductive layer disposed on the second insulation layer. The first conductive layer may include the first scan signal line Pgate, the second scan signal line Scan, the light emitting control signal line EM, and the first electrode plate Ce1 of the storage capacitor.

Figure 11E:
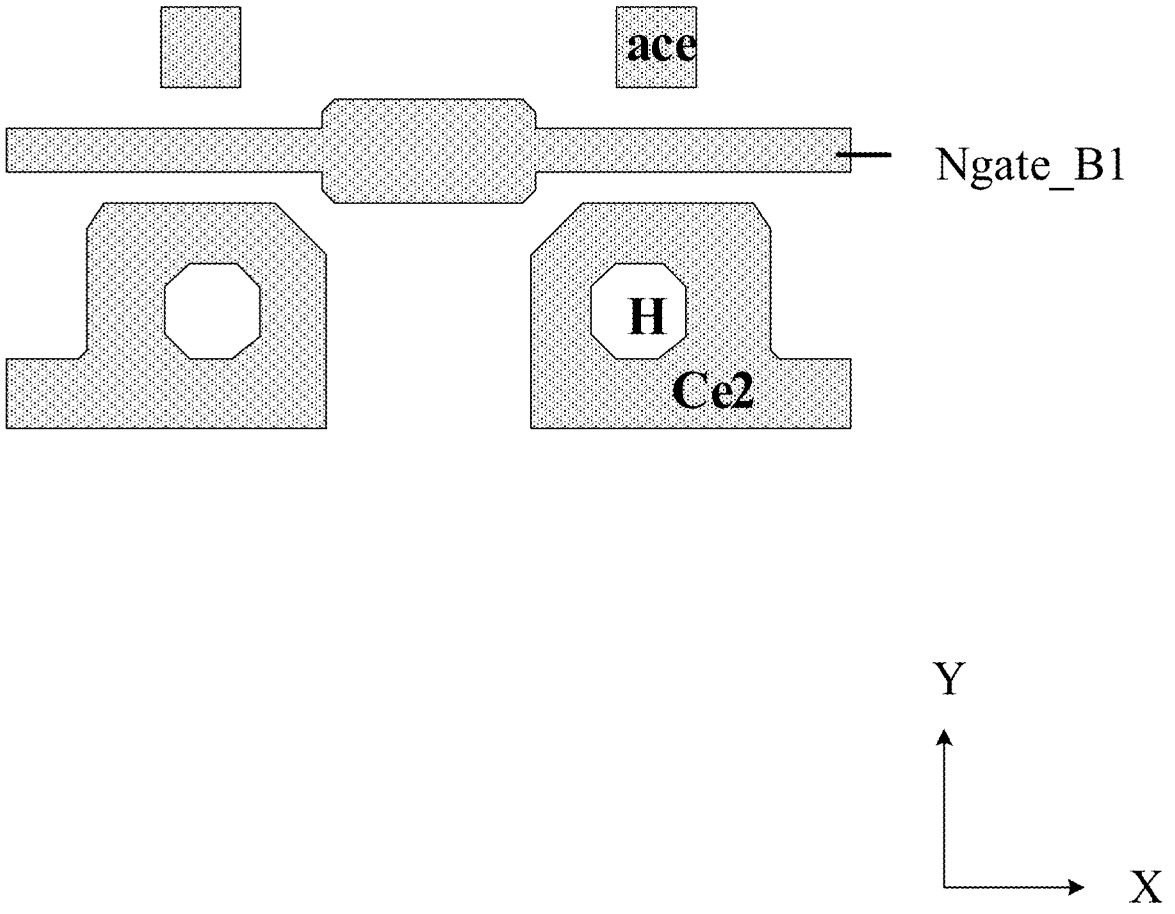
FIG. 11E is a schematic diagram of a pattern of a second conductive layer in a pixel circuit according to an embodiment of the present disclosure.

(14) A pattern of a second conductive layer is formed. In an exemplary embodiment, forming the pattern of the second conductive layer may include: depositing sequentially a third insulation thin film and a second metal thin film on the base substrate on which aforementioned patterns are formed, and patterning the second metal thin film through a patterning process to form a third insulation layer covering the first conductive layer and the pattern of the second conductive layer disposed on the third insulation layer. The pattern of the second conductive layer at least includes a first connection electrode ace, a second electrode plate Ce2 of the storage capacitor, and a first branch Ngate_B1 of the third scan signal line Ngate, as shown in FIG. 11E. In an exemplary embodiment, the second conductive layer may be referred to as a second gate metal (GATE2) layer.

In conjunction with FIGS. 11A and 11E, in an exemplary embodiment, there is a region where an orthographic projection of the first connection electrode ace on the base substrate is overlapped with an orthographic projection of the first scan signal line Pgate on the base substrate. The first connection electrode ace is configured to be connected with a fourth connection electrode Cln subsequently formed through a fifth via V5 subsequently formed, and the fourth connection electrode Cln is connected with the first electrode plate Ce1 through a fourth via V4 subsequently formed. The first electrode plate Ce1 simultaneously serves as the gate electrode of the drive transistor Td, so that the gate electrode of the drive transistor and the first scan signal line Pgate form an adjustment capacitor, and a data voltage may be subsequently adjusted through the adjustment capacitor.

In an exemplary embodiment, the first branch Ngate_B1 extends along the first direction X. The second electrode plate Ce2 of the storage capacitor is located between the first branch Ngate_B1 and the light emitting control signal line EM.

In an exemplary embodiment, an outline of the second electrode plate Ce2 may be in a shape of a rectangle and corners of the rectangle may be chamfered. There is a region where an orthographic projection of the second electrode plate Ce2 on the base substrate is overlapped with the orthographic projection of the first electrode plate Ce1 on the base substrate. The second electrode plate 32 is provided with an opening H, and the opening H may be located in a middle of the second electrode plate Ce2. The opening H may be in a shape of a regular hexagon, so that the second electrode plate Ce2 forms an annular structure. The opening H exposes the third insulation layer covering the first electrode plate Ce1, and the orthographic projection of the first electrode plate Ce1 on the base substrate contains an orthographic projection of the opening H on the base substrate. In an exemplary embodiment, the opening H is configured to accommodate a first via that is subsequently formed. The first via is located in the opening H and exposes the first electrode plate Ce1, so that a second electrode of the leakage-proof transistor Tlp that is subsequently formed is connected with the first electrode plate Ce1.

After this process, the display substrate includes the light shielding layer disposed on the base substrate, the first insulation layer disposed on the light shielding layer, the first semiconductor layer disposed on the first insulation layer, the second insulation layer covering the first semiconductor layer, the first conductive layer disposed on the second insulation layer, the third insulation layer covering the first conductive layer, and the second conductive layer disposed on the third insulation layer. The second conductive layer at least includes the second electrode plate Ce2 of the storage capacitor and the first branch Ngate_B1 of the third scan signal line Ngate.

(15) A pattern of a second semiconductor layer is formed. In an exemplary embodiment, forming the pattern of the second semiconductor layer may include sequentially depositing a fourth insulation thin film and a second semiconductor thin film on the base substrate on which aforementioned patterns are formed, and patterning the second semiconductor thin film through a patterning process to form a fourth insulation layer covering the base substrate and the second semiconductor layer disposed on the fourth insulation layer, as shown in FIG. 11F.

Figure 11F:
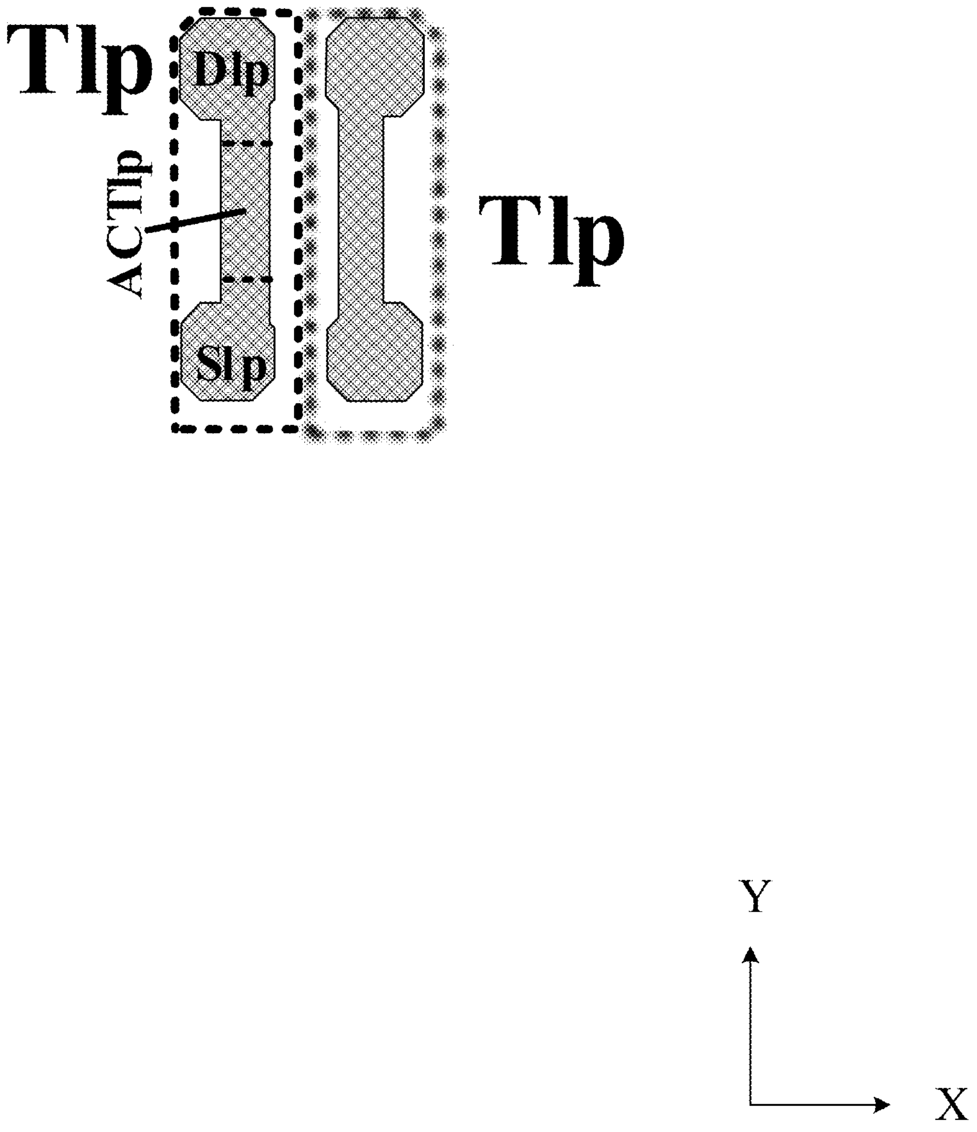
FIG. 11F is a schematic diagram of a pattern of a second semiconductor layer in a pixel circuit according to an embodiment of the present disclosure.

As shown in FIG. 11F, the second semiconductor layer of each sub-pixel may include a leakage-proof active layer ACTIp of the leakage-proof transistor Tlp. In an exemplary embodiment, the leakage-proof active layer ACTIp extends along the second direction Y and the leakage-proof active layer ACTIp may be in a shape of a dumbbell.

In an exemplary embodiment, a second region Dlp of the leakage-proof active layer ACTIp is adjacent to the first reset active layer of the first reset transistor Tr1, and a first region Slp of the leakage-proof active layer ACTIp is adjacent to the first capacitor Cst.

In an exemplary embodiment, the second semiconductor layer may be made of an oxide, that is, the leakage-proof transistor is an oxide thin film transistor.

After this process, the display substrate includes the light shielding layer disposed on the base substrate, the first insulation layer disposed on the light shielding layer, the first semiconductor layer disposed on the first insulation layer, the second insulation layer covering the first semiconductor layer, the first conductive layer disposed on the second insulation layer, the third insulation layer covering the first conductive layer, the second conductive layer disposed on the third insulation layer, the fourth insulation layer covering the second conductive layer and the second semiconductor layer disposed on the fourth insulation layer. The second semiconductor layer at least includes the leakage-proof active layer ACTIp.

Figure 11G:
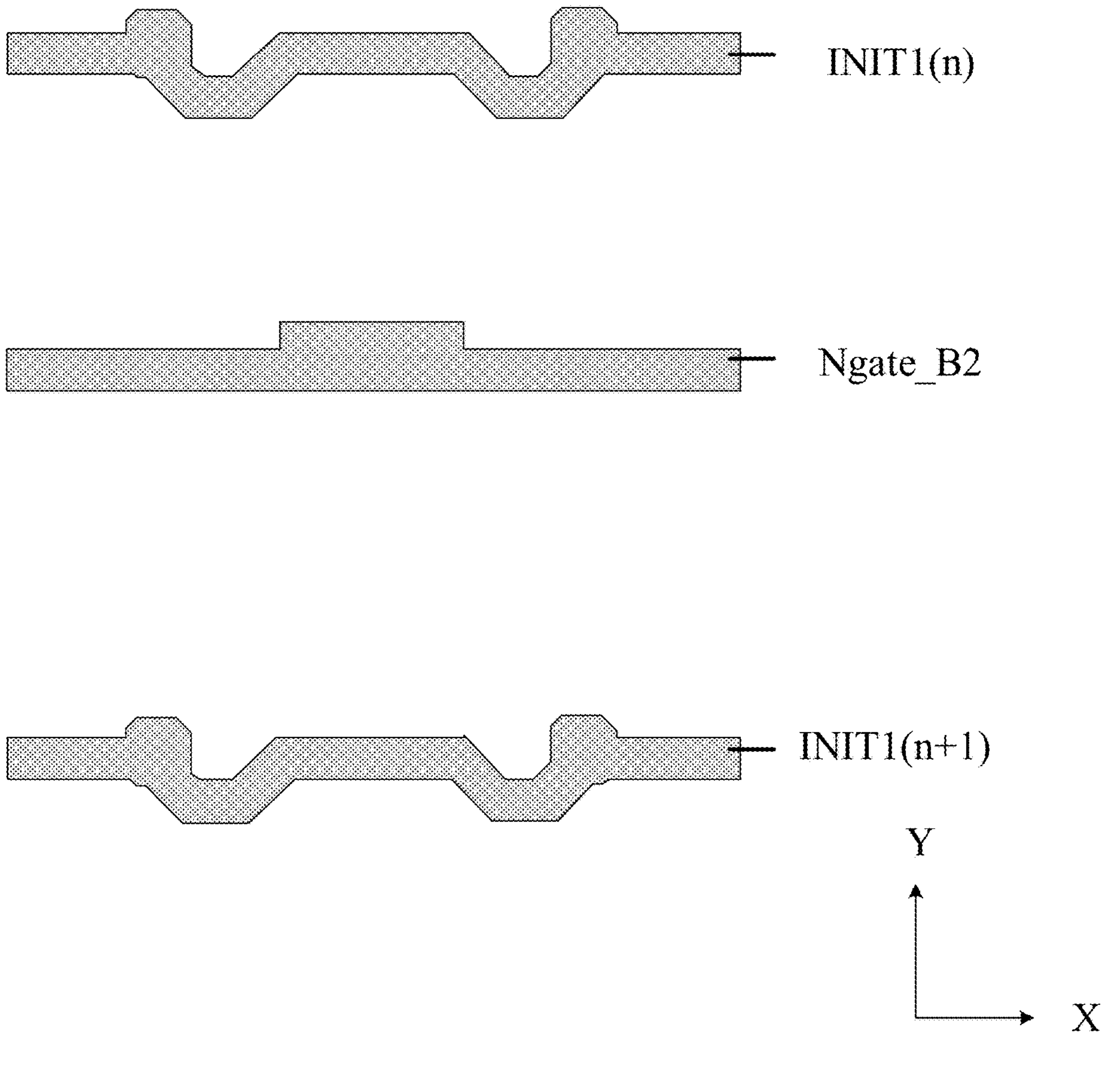
FIG. 11G is a schematic diagram of a pattern of a third conductive layer in a pixel circuit according to an embodiment of the present disclosure.

(16) A pattern of a third conductive layer is formed. In an exemplary embodiment, forming the pattern of the third conductive layer may include: sequentially depositing a fifth insulation thin film and a third metal thin film on the base substrate on which aforementioned patterns are formed, and patterning the fifth insulation thin film and the third metal thin film through a patterning process to form a fifth insulation layer disposed on the second semiconductor layer and the pattern of the third conductive layer disposed on the fifth insulation layer 95. The pattern of the third conductive layer at least includes a second branch Ngate_B2 of the third scan signal line Ngate and the first initial signal line INIT1, as shown in FIG. 11G. In an exemplary embodiment, the third conductive layer may be referred to as a third gate metal (GATE3) layer.

As shown in FIG. 11G, in an exemplary embodiment, the second branch Ngate_B2 and the first initial signal line INIT1 extend along the first direction X, the second branch Ngate_B2 is adjacent to the first scan signal line Pgate, and the first initial signal line INIT1 is adjacent to the second scan signal line Scan. In an exemplary embodiment, a region where the second branch Ngate_B2 is overlapped with the leakage-proof active layer serves as a gate electrode of the leakage-proof transistor.

After this process, the display substrate includes the light shielding layer disposed on the base substrate, the first insulation layer disposed on the light shielding layer, the first semiconductor layer disposed on the first insulation layer, the second insulation layer covering the first semiconductor layer, the first conductive layer disposed on the second insulation layer, the third insulation layer covering the first conductive layer, the second conductive layer disposed on the third insulation layer, the fourth insulation layer covering the second conductive layer, and the second semiconductor layer disposed on the fourth insulation layer, the fifth insulation layer covering the second semiconductor layer, and the third conductive layer disposed on the fifth insulation layer. The third conductive layer at least includes the second branch Ngate_B2 of the third scan signal line Ngate and the first initial signal line INIT1.

(17) A pattern of poly silicon vias is formed. In an exemplary embodiment, forming the pattern of the poly silicon vias may include: depositing a sixth insulation thin film on the base substrate on which aforementioned patterns are formed, and patterning the sixth insulation thin film through a patterning process to form a sixth insulation layer covering the third conductive layer. Multiple vias are provided on the sixth insulation layer, and at least include a second via V2, a fourth via V4, a fifth via V5, a seventh via V7, an eighth via V8, a ninth via V9, an eleventh via V11, and a thirteenth via V13, as shown in FIG. 11H.

Figure 11H:
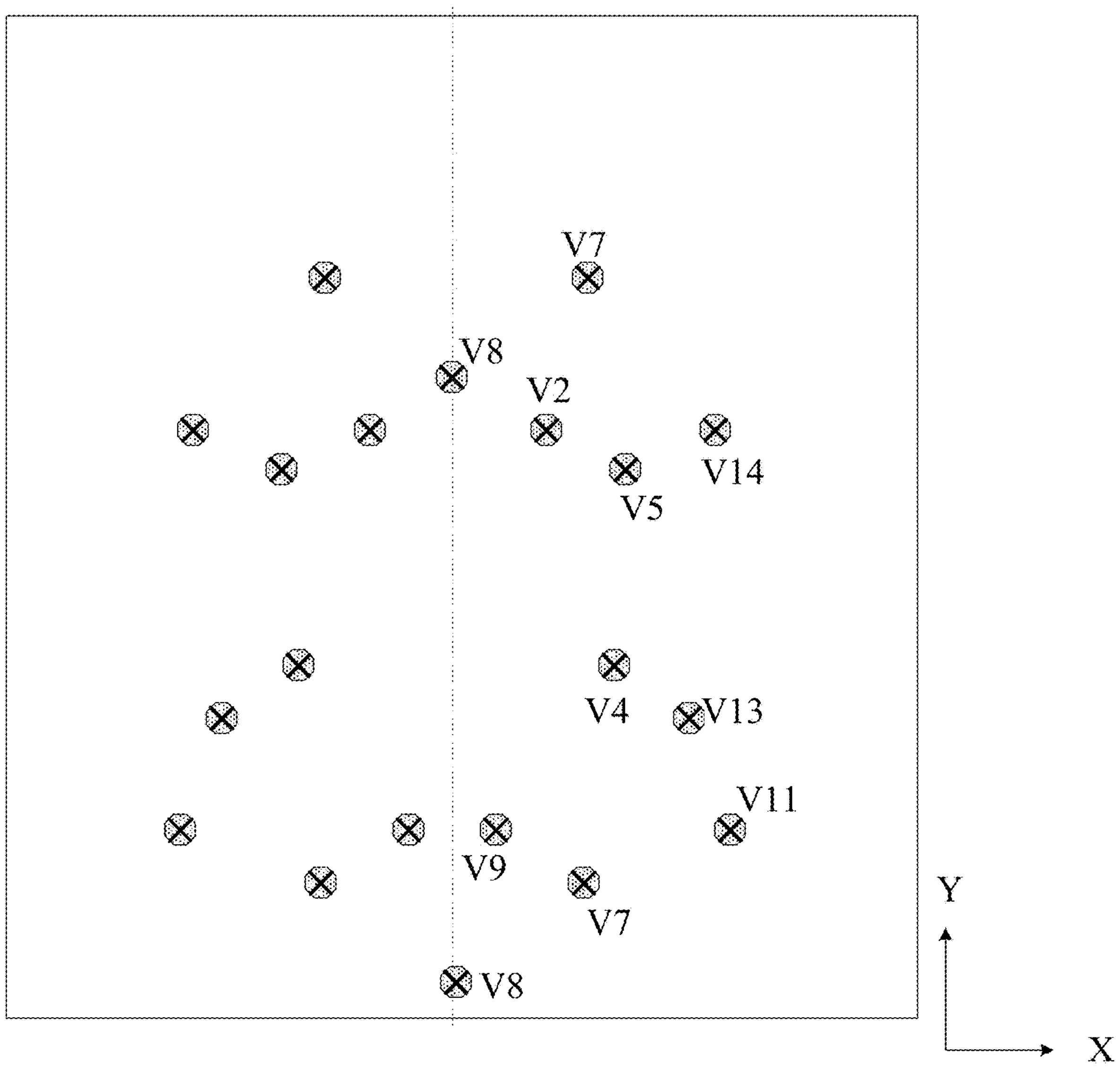
FIG. 11H is a schematic diagram of a pattern of a poly silicon via formed in a pixel circuit according to an embodiment of the present disclosure.
Figure 12A:
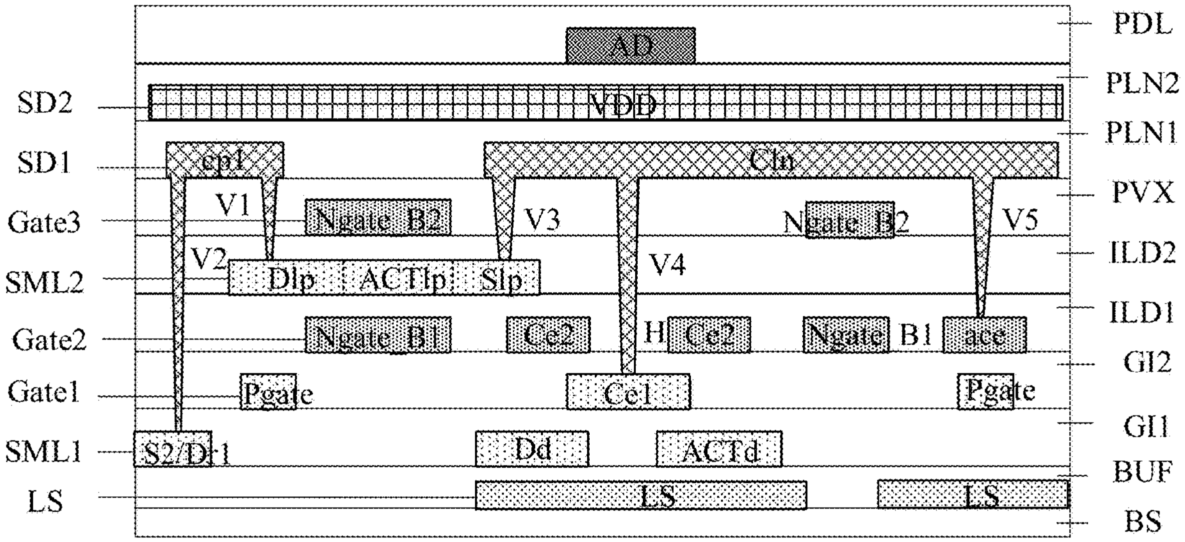
FIG. 12A is a cross-sectional view taken along a direction A-A' in FIG. 11A.

In conjunction with FIGS. 11H and 12A, in an exemplary embodiment, the sixth insulation layer, the fifth insulation layer, the fourth insulation layer, the third insulation layer, and the second insulation layer in the second via V2 are etched off to expose a surface of a first region of the second active layer (i.e., a second region of the first reset active layer). The second via V2 is configured such that a first electrode of the second transistor T2 subsequently formed is connected with the second active layer through the via and a second electrode of the first reset transistor Tr1 subsequently formed is connected with the first reset active layer through the via.

In conjunction with FIGS. 11H and 12A, in an exemplary embodiment, the fourth via V4 is located in the opening H of the second electrode plate Ce2, and an orthographic projection of the fourth via V4 on the base substrate is located in a range of the orthographic projection of the opening H on the base substrate. The sixth insulation layer, the fifth insulation layer, the fourth insulation layer, and the third insulation layer in the fourth via V4 are etched off to expose a surface of the first electrode plate Ce1. The fourth via V4 is configured such that a connection electrode Cln formed subsequently is connected with the first electrode plate Ce1 through this via.

In conjunction with FIGS. 11H and 12A, in an exemplary embodiment, the sixth insulation layer, the fifth insulation layer, and the fourth insulation layer in the fifth via V5 are etched off to expose a surface of the first connection electrode ace.

Figure 12B:
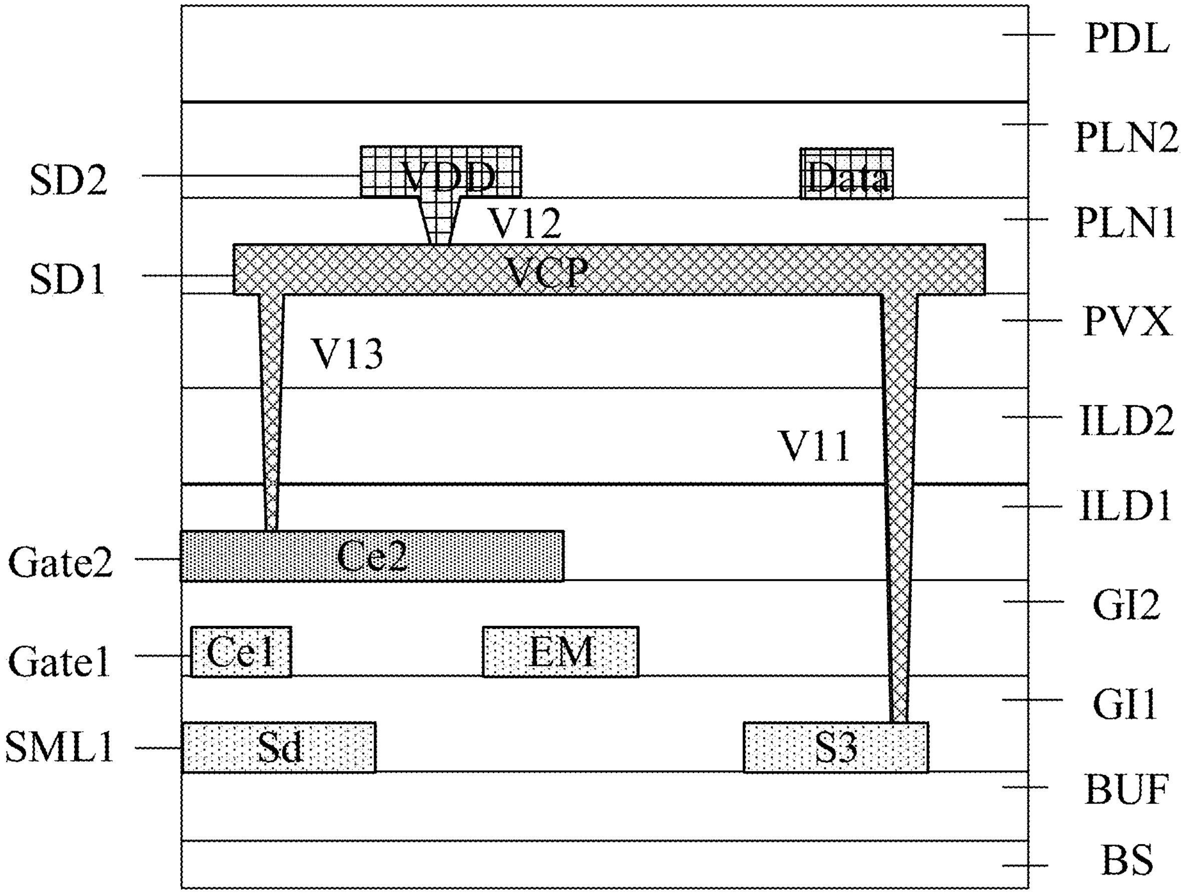
FIG. 12B is a cross-sectional view taken along a direction B-B' in FIG. 11A.
Figure 12C:
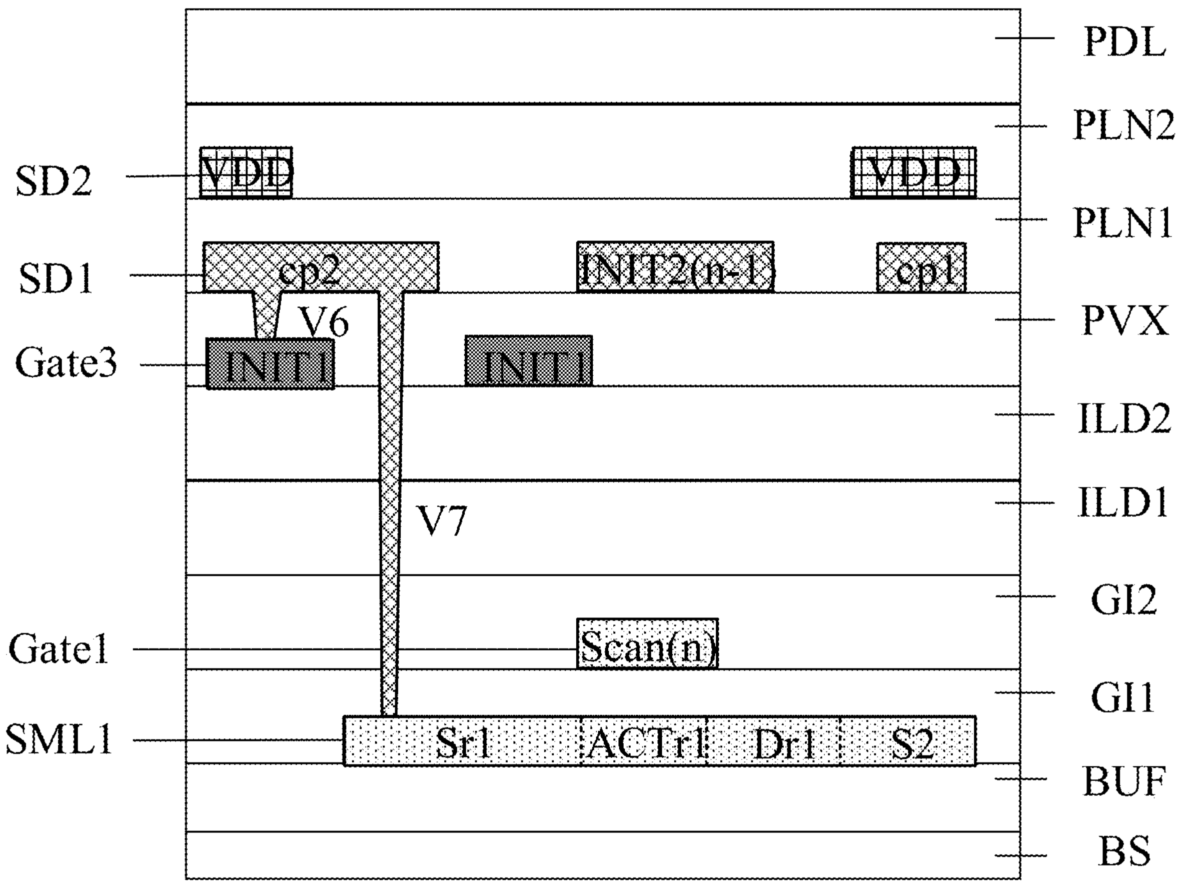
FIG. 12C is a cross-sectional view taken along a direction C-C' in FIG. 11A.

In conjunction with FIGS. 11H and 12C, in an exemplary embodiment, the sixth insulation layer, the fifth insulation layer, the fourth insulation layer, the third insulation layer, and the second insulation layer in the seventh via V7 are etched off to expose a surface of a first region of the first reset active layer. The seventh via V7 is configured such that the first electrode of the first reset transistor Tr1 subsequently formed is connected with the first reset active layer through this via.

Figure 12D:
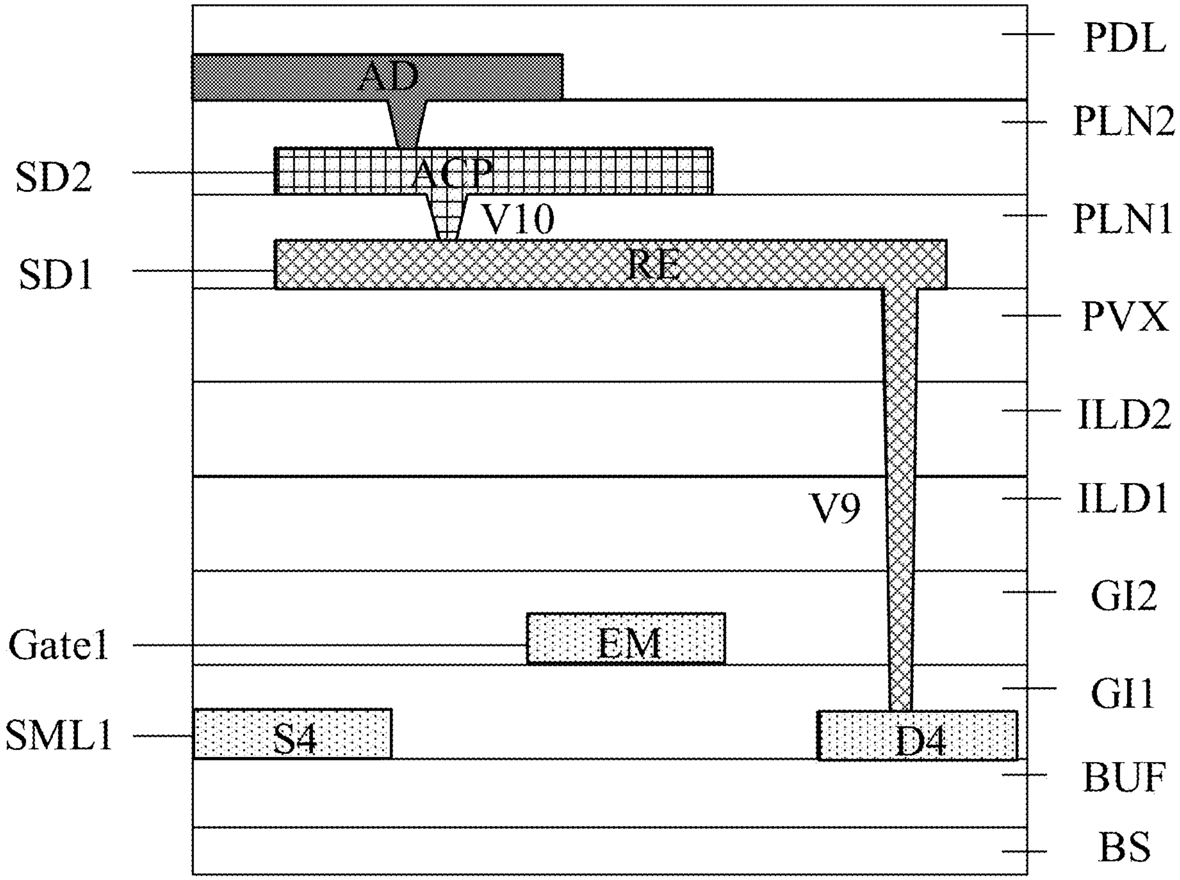
FIG. 12D is a cross-sectional view taken along a direction D-D' in FIG. 11A.
Figure 12E:
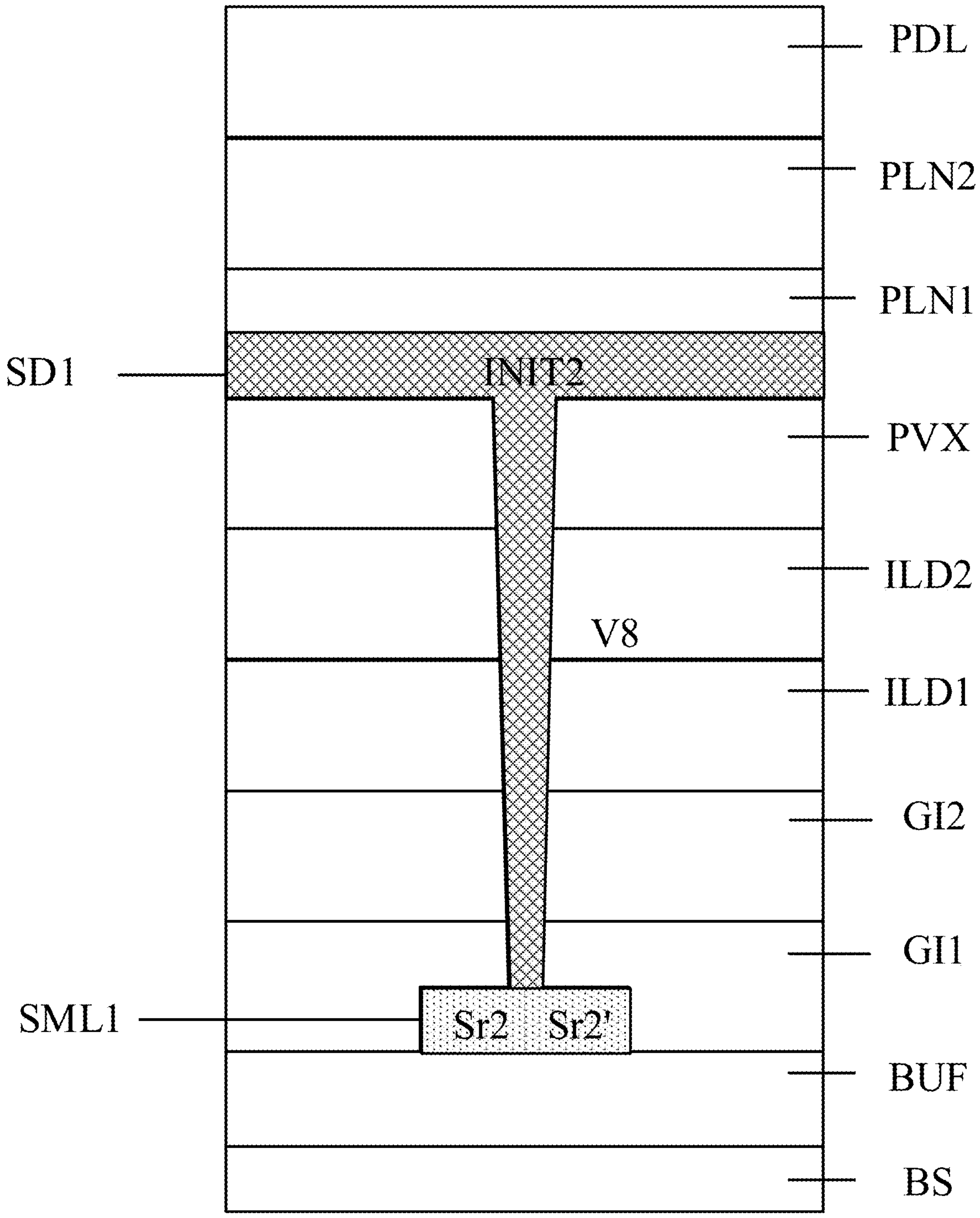
FIG. 12E is a cross-sectional view taken along a direction E-E' in FIG. 11A.

In conjunction with FIGS. 11H, 11A, and 12E, in an exemplary embodiment, the sixth insulation layer, the fifth insulation layer, the fourth insulation layer, the third insulation layer, and the second insulation layer in the eighth via V8 are etched off to expose a surface of a first region of the second reset active layer. The eighth via V8 is configured such that the second initial signal line formed subsequently is connected with the second reset active layer through this via.

In conjunction with FIGS. 11H and 12D, in an exemplary embodiment, the sixth insulation layer, the fifth insulation layer, the fourth insulation layer, the third insulation layer, and the second insulation layer in the ninth via V9 are etched off to expose a surface of a second region of the fourth active layer (i.e., a second region of the second reset active layer). The ninth via V9 is configured such that a second electrode of the fourth transistor T4 subsequently formed is connected with the fourth active layer through this via and a second electrode of the second reset transistor Tr2 subsequently formed is connected with the second reset active layer through this via.

In conjunction with FIGS. 11H and 12B, in an exemplary embodiment, the sixth insulation layer, the fifth insulation layer, the fourth insulation layer, the third insulation layer, and the second insulation layer in the eleventh via V11 are etched off to expose a surface of a first region of the third active layer. The eleventh via V11 is configured such that a connection electrode VCP formed subsequently is connected with the third active layer through this via.

In conjunction with FIGS. 11H and 12B, in an exemplary embodiment, a thirteenth via V13 is located in a region where the second electrode plate Ce2 is located, and an orthographic projection of the thirteenth via V13 on the base substrate 10 is located in a range of the orthographic projection of the second electrode plate Ce2 on the base substrate. The sixth insulation layer, the fifth insulation layer, and the fourth insulation layer in the thirteenth via V13 are etched off to expose a surface of the second electrode plate Ce2. The thirteenth via V13 is configured such that the connection electrode VCP formed subsequently is connected with the second electrode plate Ce2 through this via.

In conjunction with FIGS. 11H and 11A, in an exemplary embodiment, the sixth insulation layer, the fifth insulation layer, the fourth insulation layer, the third insulation layer, and the second insulation layer in the fourteenth via V14 are etched off to expose a surface of a first region of the first active layer. The fourteenth via V14 is configured such that a data connection electrode formed subsequently is connected with the first active layer through this via.

Figure 11I:
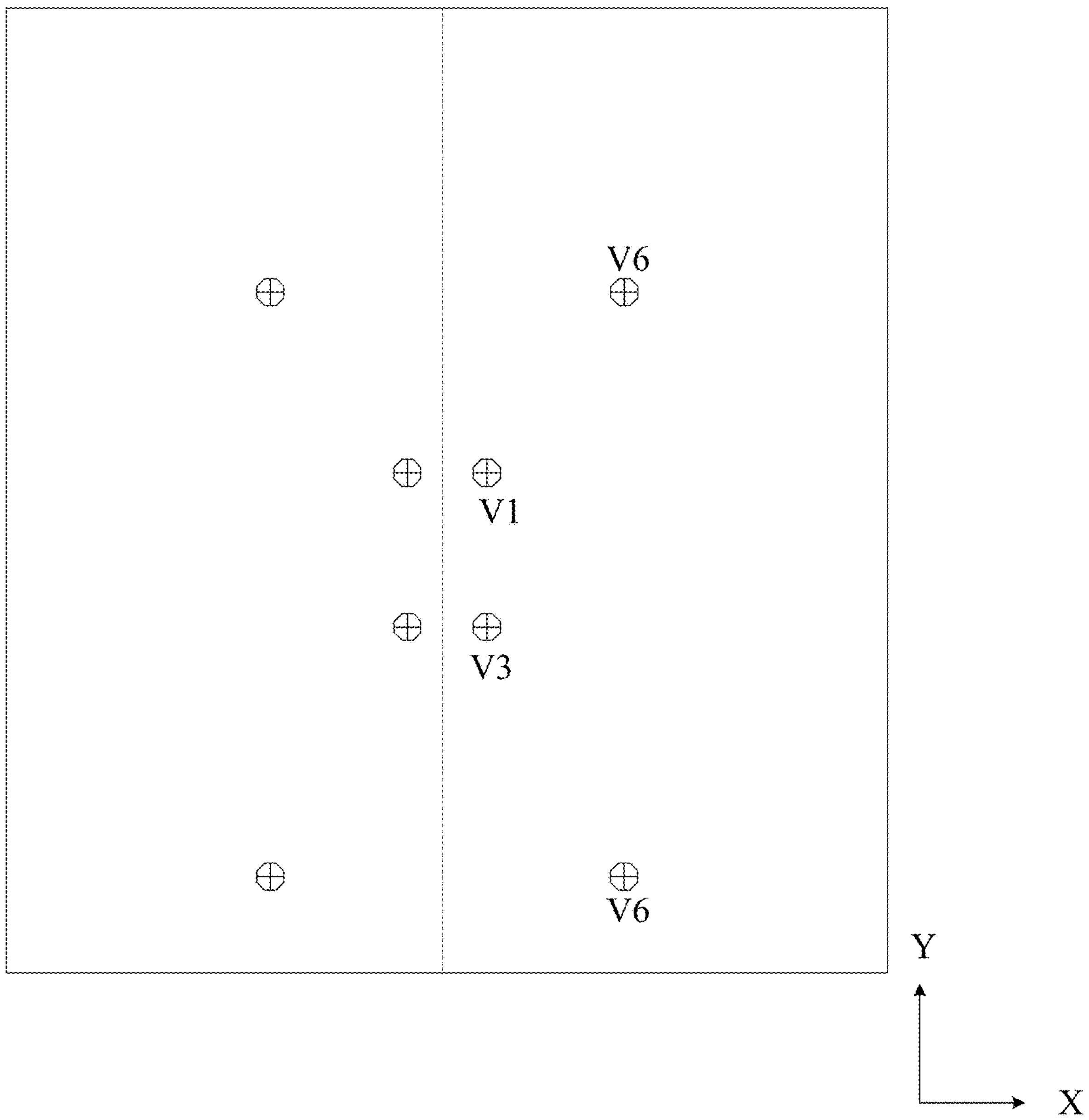
FIG. 11I is a schematic diagram of a pattern of an oxide via formed in a pixel circuit according to an embodiment of the present disclosure.

(18) A pattern of oxide vias is formed. In an exemplary embodiment, forming the pattern of the oxide vias may include: forming multiple vias through a patterning process on the base substrate on which aforementioned patterns are formed. The multiple vias at least include: a first via V1, a third via V3, and a sixth via V6, as shown in FIG. 11I.

In conjunction with FIGS. 11H, 12A, and 12C, in an exemplary embodiment, the sixth insulation layer and the fifth insulation layer in the first via V1 are etched off to expose a surface of a second region of the leakage-proof active layer. The sixth insulation layer and the fifth insulation layer in the third via V3 are etched off to expose a surface of a first region of the leakage-proof active layer. The sixth insulation layer in the sixth via V6 is etched off to expose a surface of the first initial signal line INIT1.

Figure 11J:
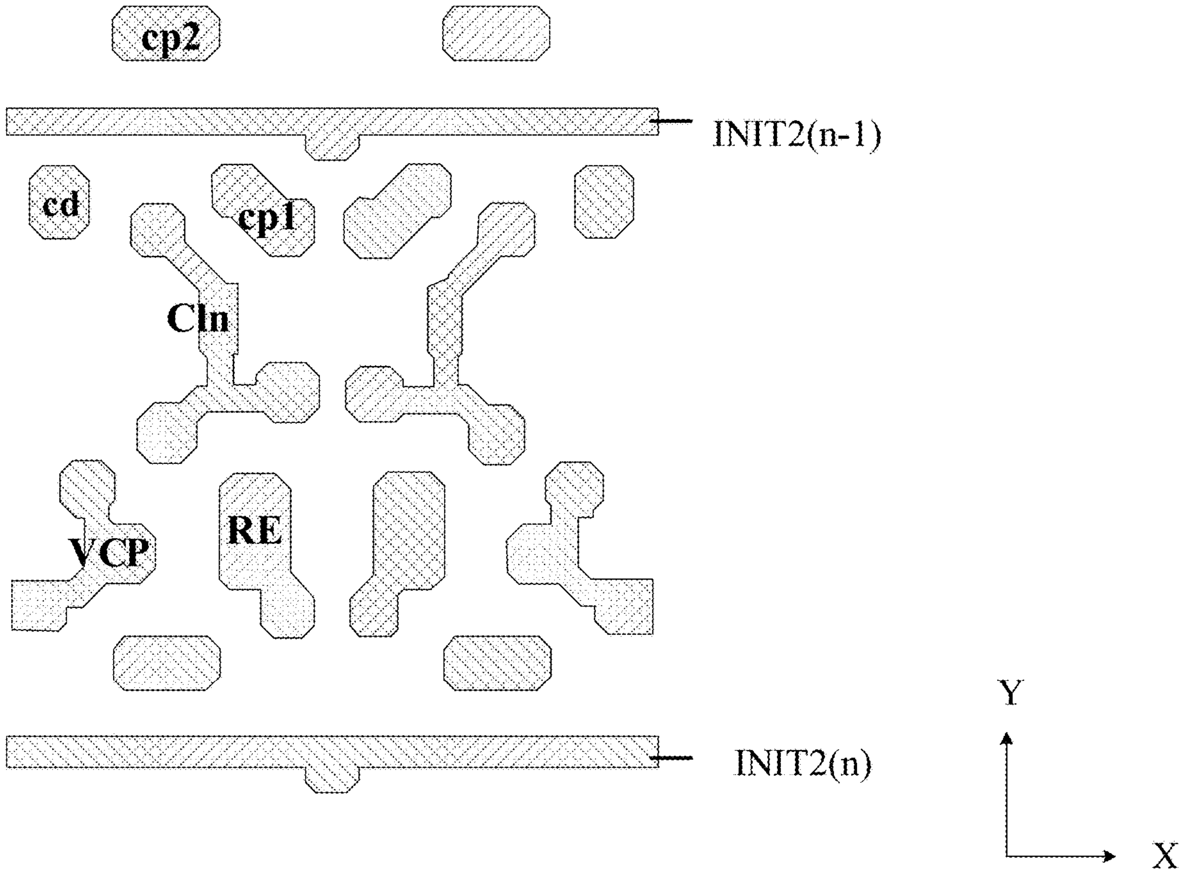
FIG. 11J is a schematic diagram of a pattern of a fourth conductive layer in a pixel circuit according to an embodiment of the present disclosure.

(19) A pattern of a fourth conductive layer is formed. In an exemplary embodiment, forming the fourth conductive layer may include: depositing a fourth metal thin film on the base substrate on which aforementioned patterns are formed, and patterning the fourth metal thin film through a patterning process to form the fourth conductive layer disposed on the sixth insulation layer. The fourth conductive layer at least includes the second initial signal line INIT2, a second connection electrode cp1, a third connection electrode cp2, the fourth connection electrode Cln, a fifth connection electrode VCP, a sixth connection electrode RE, and a seventh connection electrode cd, as shown in FIG. 11J. In an exemplary embodiment, the fourth conductive layer may be referred to as a first source drain metal (SD1) layer.

In an exemplary embodiment, the second initial signal line INIT2 extends along the first direction X, the second initial signal line INIT2 is connected with the first region of the second reset active layer through the eighth via V8, so that the first electrode of the second reset transistor Tr2 has a same potential as the second initial signal line INIT2.

In an exemplary embodiment, the second connection electrode cp1 may be in a "1" shape, one terminal of which is connected with the second region of the leakage-proof active layer through the first via V1, and another terminal of which is connected with the first region of the second active layer (or the second region of the first reset active layer) through the second via V2. In an exemplary embodiment, the second connection electrode cp1 may serve as the second electrode of the leakage-proof transistor Tlp, the first electrode of the second transistor, and the second electrode of the first reset transistor.

In an exemplary embodiment, the third connection electrode cp2 may be in a shape of a rectangle, on one hand, the third connection electrode cp2 is connected with the first initial signal line INIT1 through the sixth via V6, on the other hand, the third connection electrode cp2 is connected with the first region of the first reset active layer through the seventh via V7. In an exemplary embodiment, the third connection electrode cp2 may serve as the first electrode of the first reset transistor Tr1.

In an exemplary embodiment, on one hand, the fourth connection electrode Cln is connected with the first region of the leakage-proof active layer through the third via V3, on the other hand, the fourth connection electrode Cln is connected with the first electrode plate Ce1 through the fourth via V4, and simultaneously is connected with the first connection electrode ace through the fifth via V5. In an exemplary embodiment the fourth connection electrode Cln may serve as the first electrode of the leakage-proof transistor Tlp.

In an exemplary embodiment, on one hand, a zigzag-shaped fifth connection electrode VCP (a power supply connection electrode) is connected with the second electrode plate Ce2 through the thirteenth via V13; on the other hand, the zigzag-shaped fifth connection electrode VCP is connected with the third active layer through the eleventh via V11, and the fifth connection electrode VCP is configured to be connected with the first power line subsequently formed through a twelfth via subsequently formed.

In an exemplary embodiment, the sixth connection electrode RE may be in a folded shape. On one hand, the sixth connection electrode RE is connected with the second region of the fourth active layer (or the second region of the second reset active layer) through the ninth via V9; on the other hand, the sixth connection electrode RE is connected with the connection electrode ACP through a tenth via V10 subsequently formed. In an exemplary embodiment, the sixth connection electrode RE may serve as the second electrode of the fourth transistor T4 and the second electrode of the second reset transistor Tr2.

In an exemplary embodiment, the seventh connection electrode cd (a data connection electrode) may be in a shape of a rectangle. On the one hand, the seventh connection electrode cd is connected with the first region of the first active layer through the fourteenth via V14; on the other hand, the seventh connection electrode cd is connected with the data signal line subsequently formed through a sixteenth via V16 subsequently formed. In an exemplary embodiment, the seventh connection electrode cd may serve as the first electrode of the first transistor T1.

Figure 11K:
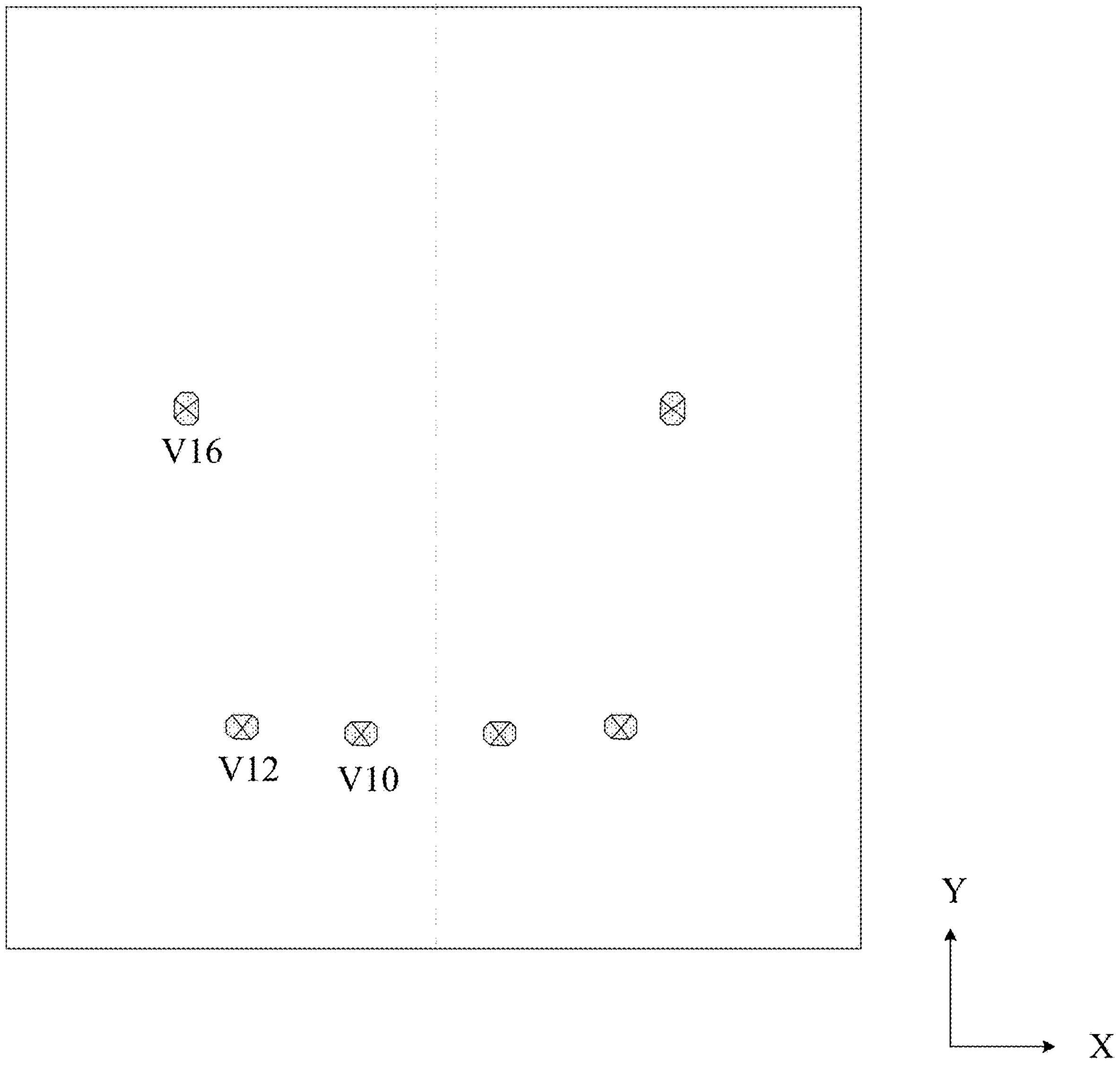
FIG. 11K is a schematic diagram of a pattern of a first planarization layer in a pixel circuit according to an embodiment of the present disclosure.
Figure 11L:
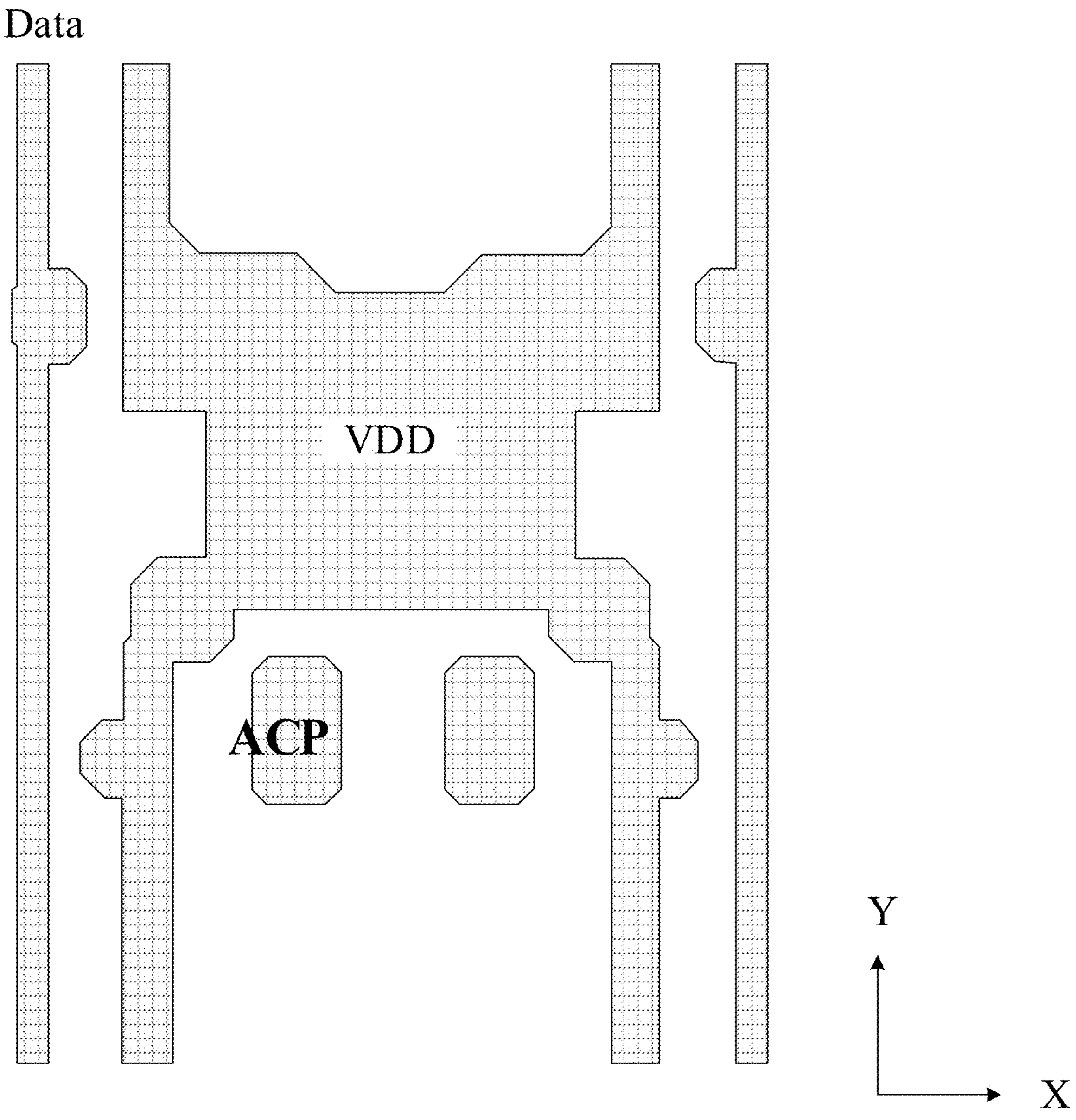
FIG. 11L is a schematic diagram of a pattern of a fifth conductive layer in a pixel circuit according to an embodiment of the present disclosure.

(20) A pattern of a fifth conductive layer is formed. In an exemplary embodiment, forming the fifth conductive layer may include: on the base substrate on which aforementioned patterns are formed, depositing a first planarization thin film and a fifth metal thin film sequentially, patterning the first planarization thin film and the fifth metal thin film through a patterning process, and forming a first planarization layer disposed on the fourth conductive layer and the pattern of the fifth conductive layer disposed on the first planarization layer. The first planarization layer at least includes the tenth via V10, the twelfth via V12, and the sixteenth via V16. The fifth conductive layer at least includes the data signal line Data, the first power line VDD, and an eighth connection electrode ACP, as shown in FIGS. 11K and 11L. In an exemplary embodiment, the fifth conductive layer may be referred to as a second source drain metal (SD2) layer.

In an exemplary embodiment, the data signal line Data extends along the second direction Y, the data signal line Data is connected with the data connection electrode cd through the sixteenth via V16. Since the data connection electrode cd is connected with the first region of the first active layer through the fourteenth via V14, a connection between the data signal line and the first electrode of the first transistor is achieved, so that a data signal transmitted by the data signal line may be written to the first transistor.

In an exemplary embodiment, the first power line VDD is connected with the fifth connection electrode VCP through the twelfth via V12.

In an exemplary embodiment, the eighth connection electrode ACP may be in a shape of a rectangle, and the eighth connection electrode ACP (an anode connection electrode) is connected with the sixth connection electrode RE through the tenth via V10.

Figure 11M:
FIG. 11M is a schematic diagram of a pattern of a second planarization layer in a pixel circuit according to an embodiment of the present disclosure.

(21) A pattern of a second planarization layer is formed. In an exemplary embodiment, forming the pattern of the second planarization layer may include: coating a second planarization thin film on the base substrate on which aforementioned patterns are formed, and patterning the second planarization thin film through a patterning process to form the second planarization layer that covers the fifth conductive layer. The second planarization layer is at least provided with a seventeenth via V17, as shown in FIG. 11M.

In an exemplary embodiment, the seventeenth via V17 is located in an region where the eighth connection electrode ACP is located, the second planarization layer in the seventeenth via V17 is removed to expose a surface of the eighth connection electrode ACP, and the seventeenth via V17 is configured such that an anode subsequently formed is connected with the eighth connection electrode ACP through this via.

Figure 11N:
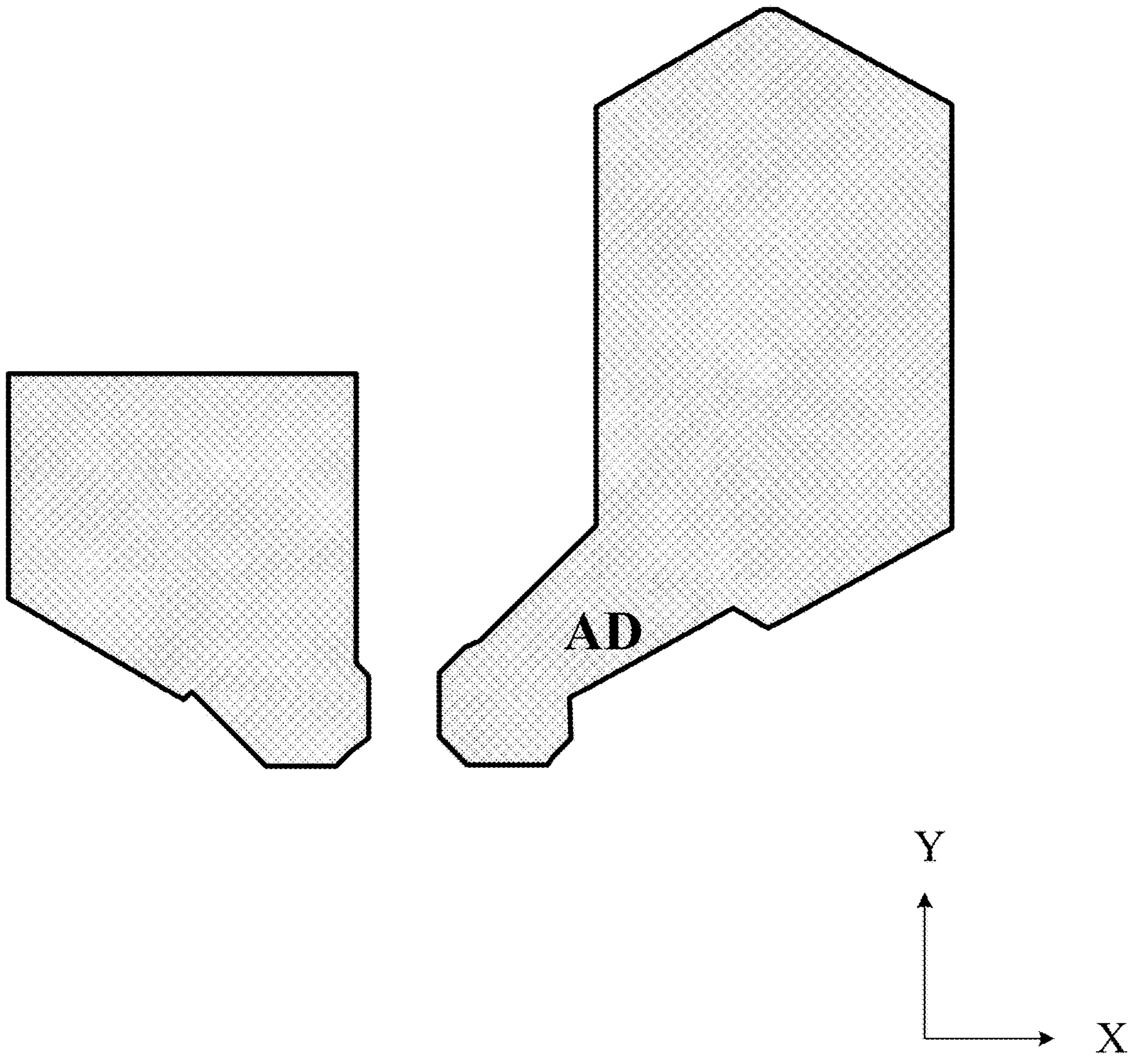
FIG. 11N is a schematic diagram of a pattern of an anode in a pixel circuit according to an embodiment of the present disclosure.

(25) A pattern of the anode is formed. In an exemplary embodiment, forming the pattern of the anode may include: depositing a transparent conductive thin film on the base substrate on which aforementioned patterns are formed, and patterning the transparent conductive thin film through a patterning process to form the anode disposed on the second planarization layer, as shown in FIG. 11N.

In an exemplary embodiment, the anode is connected with the eighth connection electrode ACP through the seventeenth via V17. Since the eighth connection electrode ACP is connected with the sixth connection electrode RE through the tenth via V10, and the sixth connection electrode RE is connected with the second region of the fourth active layer (or the second region of the second reset active layer) through the ninth via V9, thereby achieving that the pixel circuit may drive the light emitting element to emit light.

Figure 11O:
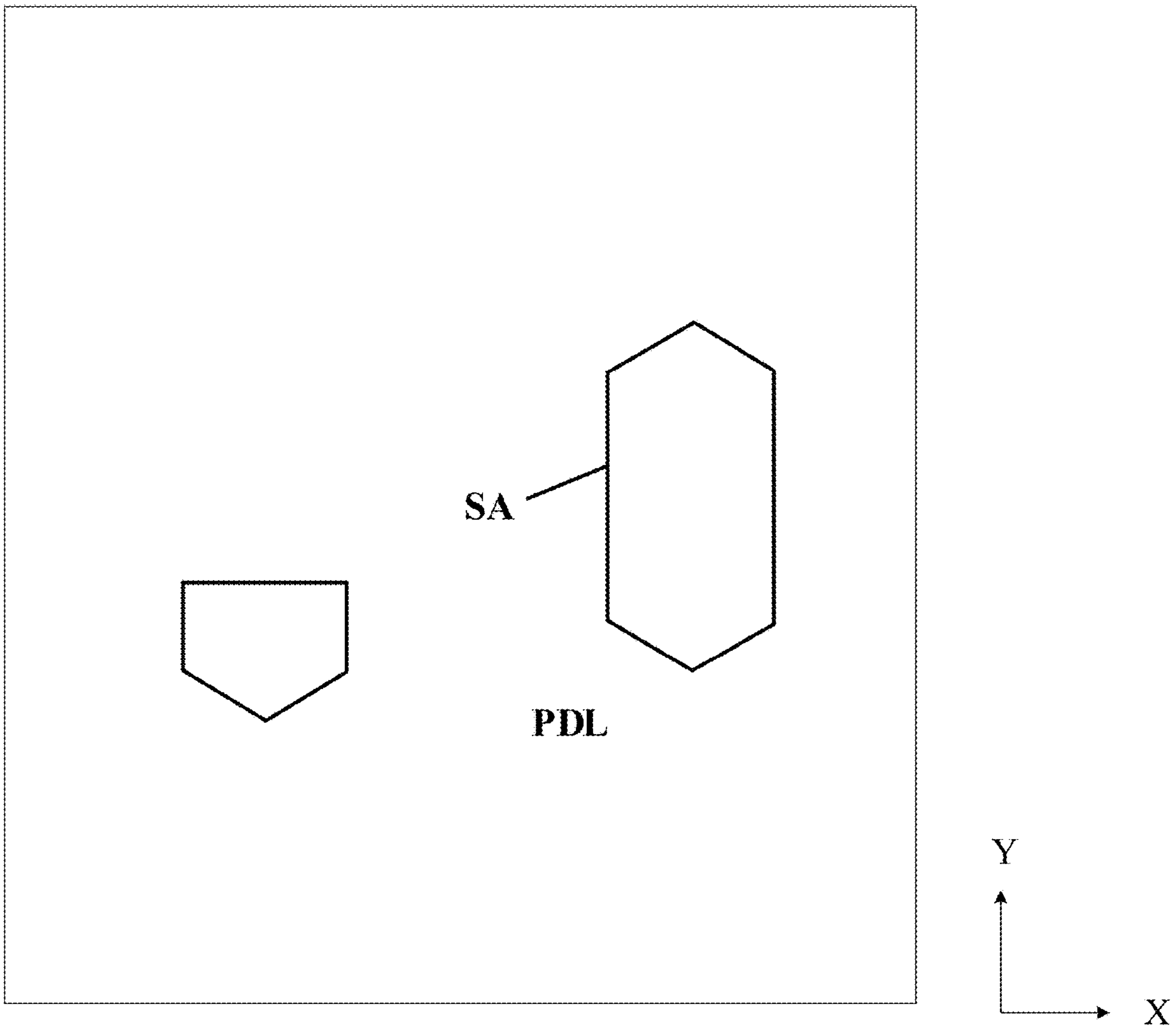
FIG. 11O is a schematic diagram of a pattern of a pixel definition layer in a pixel circuit according to an embodiment of the present disclosure.

In an exemplary embodiment, a subsequent preparation process may include: coating a pixel definition thin film, and patterning the pixel definition thin film through a patterning process to form a Pixel Definition Layer (PDL). The pixel definition layer of each sub-pixel is provided with a Sub-pixel Aperture (SA) exposing the anode, as shown in FIG. 11O. An organic light emitting layer is formed using an evaporation or ink-jet printing process, and a cathode is formed on the organic light emitting layer. An encapsulation layer is formed. The encapsulation layer may include a first encapsulation layer, a second encapsulation layer, and a third encapsulation layer that are stacked. The first encapsulation layer and the third encapsulation layer may be made of an inorganic material. The second encapsulation layer may be made of an organic material. The second encapsulation layer is disposed between the first encapsulation layer and the third encapsulation layer, so that it may be ensured that external water vapor cannot enter a light emitting structure layer.

In an exemplary implementation, the base substrate may be a flexible base substrate, or may be a rigid base substrate. The rigid base substrate may be made of, but is not limited to, one or more of glass and quartz. The flexible base substrate may be made of, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers. In an exemplary implementation mode, the flexible base substrate may include a first flexible material layer, a first inorganic material layer, a semiconductor layer, a second flexible material layer, and a second inorganic material layer which are stacked, wherein materials of the first flexible material layer and the second flexible material layer may be polyimide (PI), polyethylene terephthalate (PET), or a surface-treated polymer soft film, or the like; materials of the first inorganic material layer and the second inorganic material layer may be Silicon Nitride (SiNx) or Silicon Oxide (SiOx), or the like, for improving water and oxygen resistance of the base substrate; and A material of the semiconductor layer may be amorphous silicon (a-si).

In an exemplary embodiment, the first conductive layer, the second conductive layer, the third conductive layer, and the fourth conductive layer may be made of metal materials, such as any one or more of silver (Ag), copper (Cu), aluminum (A1), and molybdenum (Mo), or an alloy material of the above metals, such as an Aluminum Neodymium alloy (AlNd) or a Molybdenum Niobium alloy (MoNb), and may be of a single-layer structure or a multi-layer composite structure, such as Mo/Cu/Mo. The first insulation layer, the second insulation layer, the third insulation layer, the fourth insulation layer, the fifth insulation layer, and the sixth insulation layer may be made of any one or more of Silicon Oxide (SiOx), Silicon Nitride (SiNx), and Silicon OxyNitride (SiON), and may be a single layer, a multi-layer, or a composite layer. The first insulation layer is referred to as a buffer (BUF) layer, which is used for improving water and oxygen resistance of the base substrate, the second insulation layer is referred to as a first Gate Insulator (GI1), and the third insulation layer is referred to as a second Gate Insulator (GI2), the fourth insulation layer is referred to as a first interlayer Dielectric (ILD1) layer, the fifth insulation layer is referred to as a second interlayer Dielectric (ILD2) layer, and the sixth insulation layer is referred to as a Passivation (PVX) layer. The first Planarization (PLN1) layer and the second Planarization (PLN2) layer may be made of an organic material, and the transparent conductive thin film may be made of Indium Tin Oxide (ITO) or Indium Zinc Oxide (IZO). The first semiconductor layer (SML1) may be made of poly Silicon (p-Si) and the second semiconductor layer (SML2) may be made of an oxide.

In the display substrate according to the embodiment of the present disclosure, the writing sub-circuit is connected with the first scan signal line Pgate and the first reset sub-circuit is connected with the second scan signal line Scan, in the low frequency display mode, the frequency of the control signal of the first scan signal line Pgate is the first frequency, the frequency of the control signal of the second scan signal line Scan is the second frequency, and the second frequency is greater than the first frequency, thus charges on the surface of the anode terminal of the light emitting element EL are eliminated, and time for the brightness of the light emitting element EL to reach the stable state is kept consistent in the low frequency display mode, so that screen flicker is obviously improved, and the writing sub-circuit does not repeatedly write a data voltage and a voltage signal of the first power line, ensuring stability of a current.

The structure of the display substrate and the preparation process therefor shown in the present disclosure are merely illustrative. In an exemplary implementation mode, a corresponding structure may be changed and patterning processes may be increased or decreased according to actual needs, which is not limited in the present disclosure.

An embodiment of the present disclosure is also provided a drive method of a pixel circuit, which is used for driving the aforementioned pixel circuit. In an exemplary implementation mode, the drive method may include: in a reset stage, a first reset sub-circuit resets an anode terminal of a light emitting element in response to a control signal of a second scan signal line; in a data writing stage, a writing sub-circuit writes a data voltage signal to a first electrode of a drive sub-circuit in response to a control signal of a first scan signal line; in a light emitting stage, the drive sub-circuit provides a drive current between the first electrode and a second electrode of the drive sub-circuit in response to a control signal of a first node; in a low frequency display mode, an input frequency of the control signal of the first scan signal line is the same as a data refresh frequency, and an input frequency of the control signal of the second scan signal line is greater than the data refresh frequency.

An embodiment of the present disclosure is also provided a display apparatus, which includes a display region and a peripheral region located around the display region, wherein the peripheral region includes a first bezel region and a second bezel region oppositely disposed on left and right sides of the display region. The display apparatus may be any product or component with a display function, such as a mobile phone, a tablet computer, a television, a display, a notebook computer, a digital photo frame, a navigator, an advertising panel, a watch phone, an E-book portable multimedia player, or a display screen of each product of Internet of Things. In an exemplary implementation mode, the display apparatus may be a wearable display apparatus, which can be worn on a human body in some manners, such as a smart watch and a smart bracelet.

As shown in FIGS. 13 to 17, the display region includes any pixel circuit as described above, and the peripheral region includes a first scan signal line drive circuit, a second scan signal line drive circuit, a third scan signal line drive circuit, and a light emitting control signal line drive circuit, wherein the first scan signal line drive circuit includes multiple cascaded first scan signal line shift registers, the second scan signal line drive circuit includes multiple cascaded second scan signal line shift registers, the third scan signal line drive circuit includes multiple cascaded third scan signal line shift registers, and the light emitting control signal line drive circuit includes multiple cascaded light emitting control signal line shift registers.

Figure 13:
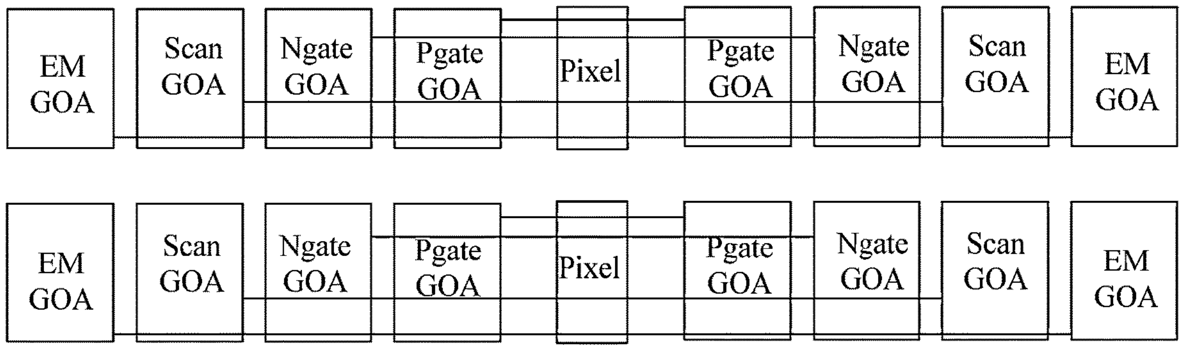
FIGS. 13 to 17 are schematic diagrams of five structures of a display apparatus according to an embodiment of the present disclosure.
Figure 14:
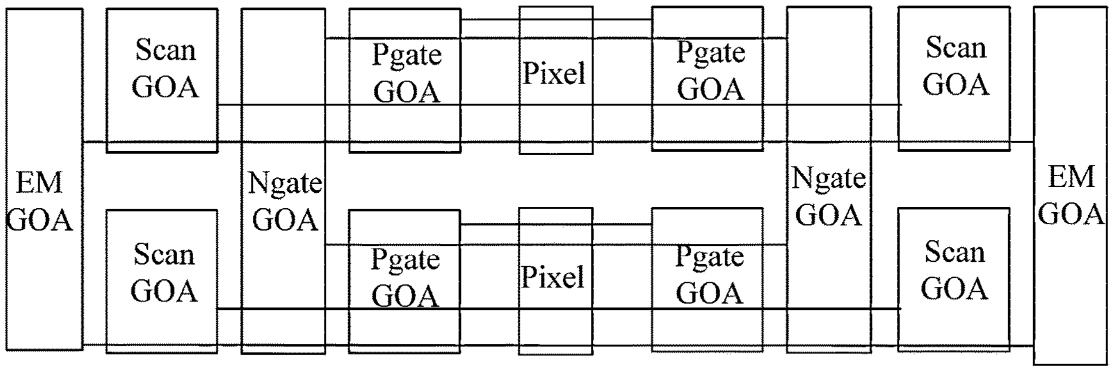
Figure 15:
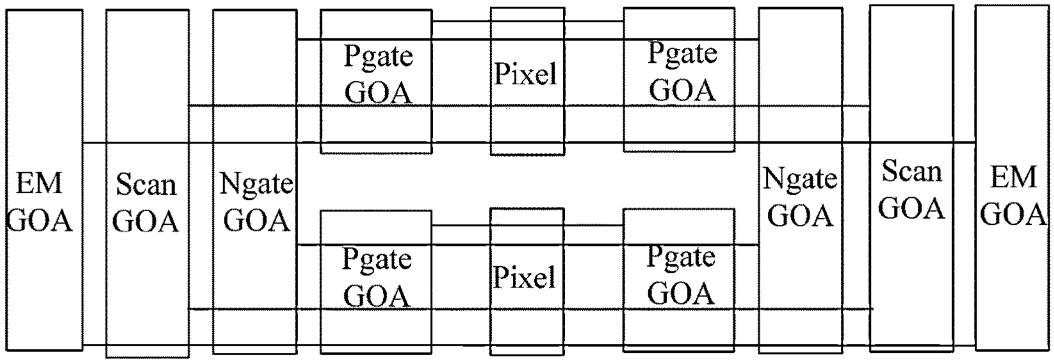

As shown in FIGS. 13 to 15, multiple first scan signal line shift registers Pgate Gate Driver on Arrays (Pgate GOAs) are divided into two groups, wherein one group is distributed in the first bezel region and another group is distributed in the second bezel region, and each first scan signal line shift register Pgate GOA is connected with a pixel circuit in a row of sub-pixels.

Multiple second scan signal line shift registers Scan GOAs are divided into two groups, wherein one group is distributed in the first bezel region and another group is distributed in the second bezel region, and each second scan signal line shift register Scan GOA is connected with a pixel circuit in one or two rows of sub-pixels.

Multiple third scan signal line shift registers Ngate GOAs are divided into two groups, wherein one group is distributed in the first bezel region, another group is distributed in the second bezel region, and each third scan signal line shift register Ngate GOA is connected with a pixel circuit in one or two rows of sub-pixels.

Multiple light emitting control signal line shift registers EM GOAs are divided into two groups, wherein one group is distributed in the first bezel region and another group is distributed in the second bezel region, and each light emitting control signal line shift register EM GOA is connected with a pixel circuit in one or two rows of sub-pixels.

As shown in FIG. 13, in the display apparatus according to the embodiment of the present disclosure, bilateral drive is used, and four groups of GOAs of the first scan signal line Pgate, the third scan signal line Ngate, the second scan signal line Scan, and the light emitting control signal line EM are respectively arranged on both sides of the display region, and each group of GOA units drives one row of sub-pixels. There are advantages of a strong drive capability and a small output signal delay (Tr/Tf), while there is a disadvantage of large occupied space, therefore it is mainly used for products that do not have high requirements on a bezel, such as laptop computers and tablet computers.

As shown in FIGS. 14 to 15, in the display apparatus according to the embodiment of the present disclosure, the bilateral drive is still used, a GOA unit is still used for the first scan signal line shift register Pgate GOA to drive a row of sub-pixels. It is mainly that the third scan signal line shift register Ngate GOA, the light emitting control signal line shift register EM GOA, and the second scan signal line shift register Scan GOA are changed to be that one GOA unit is used for driving two rows of sub-pixels, swapping vertical space for horizontal space and reducing sizes of left and right bezels. Since the first scan signal line Pgate has the shortest output effective level time when a timing is set and a key to determine pixel charging and Vth compensation time is a control signal of the first scan signal line Pgate, delay time (Tr/Tf) of output signals of the Ngate, EM, and Scan are increased to some extent, which has almost no influence on pixel operation and a display effect. This solution is mainly used for a product with some requirement on a bezel (about 1 mm), such as a mobile phone.

Figure 16:
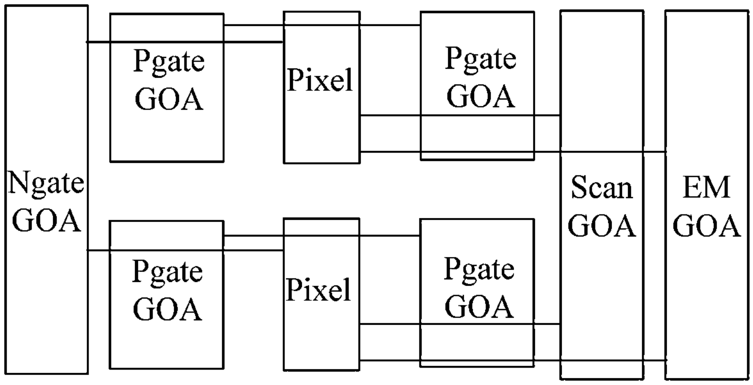

As shown in FIG. 16, multiple first scan signal line shift registers Pgate GOAs are divided into two groups, wherein one group is distributed in the first bezel region and another group is distributed in the second bezel region, and each first scan signal line shift register Pgate GOA is connected with a pixel circuit in a row of sub-pixels.

Multiple second scan signal line shift registers Scan GOAs are distributed in the first bezel region or the second bezel region, and each second scan signal line shift register Scan GOA is connected with a pixel circuit in one or two rows of sub-pixels.

Multiple third scan signal line shift registers Ngate GOAs are distributed in the first bezel region or the second bezel region, and each third scan signal line shift register Ngate GOA is connected with a pixel circuit in one or two rows of sub-pixels.

Multiple light emitting control signal line shift registers EM GOAs are distributed in the first bezel region or the second bezel region, and each light emitting control signal line shift register EM GOA is connected with a pixel circuit in one or two rows of sub-pixels.

As shown in FIG. 16, in the display apparatus according to the embodiment of the present disclosure, the third scan signal line shift register Ngate GOA, the light emitting control signal line shift register EM GOA, and the second scan signal line shift register Scan GOA are distributed on both sides of the display region by means of unilateral drive to further reduce the left and right bezels. This solution is mainly used for a product with an extremely narrow bezel (<0.8 mm).

Figure 17:
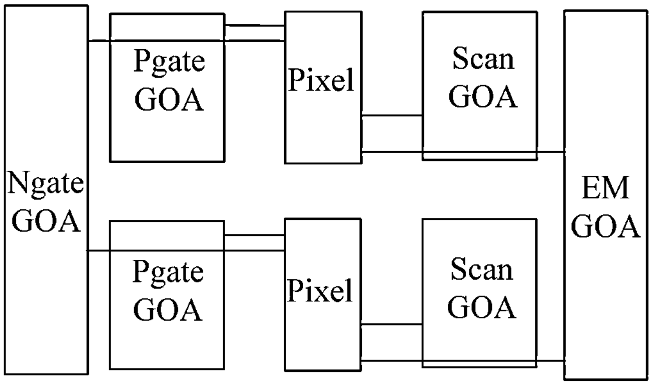

As shown in FIG. 17, multiple first scan signal line shift registers Pgate GOAs are distributed in the first bezel region or the second bezel region, and each first scan signal line shift register Pgate GOA is connected with a pixel circuit in a row of sub-pixels.

Multiple second scan signal line shift registers Scan GOAs are distributed in the first bezel region or the second bezel region, and each second scan signal line shift register Scan GOA is connected with a pixel circuit in one or two rows of sub-pixels.

Multiple third scan signal line shift registers Ngate GOAs are distributed in the first bezel region or the second bezel region, and each third scan signal line shift register Ngate GOA is connected with a pixel circuit in one or two rows of sub-pixels.

Multiple light emitting control signal line shift registers EM GOAs are distributed in the first bezel region or the second bezel region, and each light emitting control signal line shift register EM GOA is connected with a pixel circuit in one or two rows of sub-pixels.

As shown in FIG. 17, in the display apparatus according to the embodiment of the present disclosure, the first scan signal line shift register Pgate GOA also becomes unilaterally driven, and this solution is mainly used for a small-sized wearable product.

The drawings of the present disclosure only involve structures involved in the present disclosure, and other structures may refer to usual designs. The embodiments in the present disclosure, i.e., features in the embodiments, may be combined with each other to obtain new embodiments if there is no conflict.

Those of ordinary skills in the art should understand that modifications or equivalent replacements may be made to the technical solutions of the present disclosure without departing from the spirit and scope of the technical solutions of the present disclosure, and shall all fall within the scope of the claims of the present disclosure.

The invention claimed is:

1. A pixel circuit, comprising a drive sub-circuit, a writing sub-circuit, a first reset sub-circuit, and a light emitting element, wherein the drive sub-circuit is configured to provide a drive current between a first electrode and a second electrode of the drive sub-circuit in response to a control signal of a first node;

the writing sub-circuit is configured to write a data voltage signal to the first electrode of the drive sub-circuit in response to a control signal of a first scan signal line;

the first reset sub-circuit is configured to reset an anode terminal of the light emitting element in response to a control signal of a second scan signal line; and in a low frequency display mode, an input frequency of the control signal of the first scan signal line is the same as a data refresh frequency, and an input frequency of the control signal of the second scan signal line is greater than the data refresh frequency, further comprising a compensation sub-circuit, a storage sub-circuit, a leakage-proof sub-circuit, and a second reset sub-circuit;

wherein the compensation sub-circuit is configured to compensate a fifth node in response to the control signal of the first scan signal line;

the storage sub-circuit is connected with a first power line and the first node respectively;

the leakage-proof sub-circuit is configured to write a signal of the fifth node to the first node in response to a control signal of a third scan signal line; and the second reset sub-circuit is configured to reset the fifth node in response to a control signal of the second scan signal line.

2. The pixel circuit according to claim 1, wherein the drive sub-circuit comprises a drive transistor, the writing sub-circuit comprises a first transistor, and the first reset sub-circuit comprises a second reset transistor;

a control electrode of the drive transistor is connected with the first node, a first electrode of the drive transistor is connected with a second node, and a second electrode of the drive transistor is connected with a third node;

a control electrode of the first transistor is connected with the first scan signal line, a first electrode of the first transistor is connected with a data signal line, and a second electrode of the first transistor is connected with the second node; and a control electrode of the second reset transistor is connected with the second scan signal line, a first electrode of the second reset transistor is connected with a first initial signal line, and a second electrode of the second reset transistor is connected with the anode terminal of the light emitting element.

3. The pixel circuit according to claim 1, wherein the compensation sub-circuit comprises a second transistor, the storage sub-circuit comprises a first capacitor, the leakage-proof sub-circuit comprises a leakage-proof transistor, and the second reset sub-circuit comprises a first reset transistor;

a control electrode of the second transistor is connected with the first scan signal line, a first electrode of the second transistor is connected with a third node, and a second electrode of the second transistor is connected with the fifth node;

one terminal of the first capacitor is connected with the first power line, and the other terminal of the first capacitor is connected with the first node;

a control electrode of the leakage-proof transistor is connected with the third scan signal line, a first electrode of the leakage-proof transistor is connected with the fifth node, and a second electrode of the leakage-proof transistor is connected with the first node;

a control electrode of the first reset transistor is connected with the second scan signal line, a first electrode of the first reset transistor is connected with a second initial signal line, and a second electrode of the first reset transistor is connected with the fifth node.

4. The pixel circuit according to claim 1, wherein the first reset sub-circuit is connected with a first initial signal line, the second reset sub-circuit is connected with a second initial signal line, the first initial signal line provides a first reset voltage to the anode terminal of the light emitting element, and the second initial signal line provides a second reset voltage to the fifth node.

5. The pixel circuit according to claim 1, further comprising: a first light emitting control sub-circuit and a second light emitting control sub-circuit, wherein the first light emitting control sub-circuit is configured to write a voltage signal of the first power line to the first electrode of the drive sub-circuit in response to a control signal of a light emitting control signal line; and the second light emitting control sub-circuit is configured to form a path between the second electrode of the drive sub-circuit and the anode terminal of the light emitting element in response to the control signal of the light emitting control signal line.

6. The pixel circuit according to claim 5, wherein the first light emitting control sub-circuit comprises a third transistor, and the second light emitting control sub-circuit comprises a fourth transistor;

a control electrode of the third transistor is connected with the light emitting control signal line, a first electrode of the third transistor is connected with the first power line, and a second electrode of the third transistor is connected with a second node; and a control electrode of the fourth transistor is connected with the light emitting control signal line, a first electrode of the fourth transistor is connected with a third node, and a second electrode of the fourth transistor is connected with the anode terminal of the light emitting element.

7. The pixel circuit according to claim 5, wherein the drive sub-circuit comprises a drive transistor, the writing sub-circuit comprises a first transistor, the first reset sub-circuit comprises a second reset transistor, the compensation sub-circuit comprises a second transistor, the storage sub-circuit comprises a first capacitor, the leakage-proof sub-circuit comprises a leakage-proof transistor, the second reset sub-circuit comprises a first reset transistor, the first light emitting control sub-circuit comprises a third transistor, and the second light emitting control sub-circuit comprises a fourth transistor;

a control electrode of the drive transistor is connected with the first node, a first electrode of the drive transistor is connected with a second node, and a second electrode of the drive transistor is connected with a third node;

a control electrode of the first transistor is connected with the first scan signal line, a first electrode of the first transistor is connected with a data signal line, and a second electrode of the first transistor is connected with the second node; and a control electrode of the second reset transistor is connected with the second scan signal line, a first electrode of the second reset transistor is connected with a first initial signal line, and a second electrode of the second reset transistor is connected with the anode terminal of the light emitting element;

a control electrode of the second transistor is connected with the first scan signal line, a first electrode of the second transistor is connected with the third node, and a second electrode of the second transistor is connected with the fifth node;

one terminal of the first capacitor is connected with the first power line, and the other terminal of the first capacitor is connected with the first node;

a control electrode of the leakage-proof transistor is connected with the third scan signal line, a first electrode of the leakage-proof transistor is connected with the fifth node, and a second electrode of the leakage-proof transistor is connected with the first node;

a control electrode of the first reset transistor is connected with the second scan signal line, a first electrode of the first reset transistor is connected with a second initial signal line, and a second electrode of the first reset transistor is connected with the fifth node;

a control electrode of the third transistor is connected with the light emitting control signal line, a first electrode of the third transistor is connected with the first power line, and a second electrode of the third transistor is connected with the second node; and a control electrode of the fourth transistor is connected with the light emitting control signal line, a first electrode of the fourth transistor is connected with the third node, and a second electrode of the fourth transistor is connected with the anode terminal of the light emitting element.

8. The pixel circuit according to claim 7, wherein both of the first reset transistor and the second reset transistor are low temperature poly silicon thin film transistors, the leakage-proof transistor is an indium gallium zinc oxide thin film transistor.

9. The pixel circuit according to claim 8, wherein in a direction perpendicular to a display substrate, the pixel circuit comprises a base substrate, a drive circuit layer disposed on the base substrate, and a light emitting structure layer disposed on a side of the drive circuit layer away from the base substrate, the drive circuit layer comprises a light shielding layer, a first semiconductor layer, a first conductive layer, a second conductive layer, a second semiconductor layer, a third conductive layer, a fourth conductive layer, and a fifth conductive layer;

the first semiconductor layer comprises active layers of multiple low temperature poly silicon thin film transistors, the first conductive layer comprises a first scan signal line, a second scan signal line, a light emitting control signal line, and a first electrode plate of a first capacitor, the second conductive layer comprises a first branch of a third scan signal line and a second electrode plate of a storage capacitor, the second semiconductor layer comprises an active layer of an oxide thin film transistor, the third conductive layer comprises a second branch of the third scan signal line and a first initial signal line, the fourth conductive layer comprises multiple connection electrodes and a second initial signal line, and the fifth conductive layer comprises a first power line, a data signal line, and an anode connection electrode.

10. A display apparatus, comprising a display region and a peripheral region located around the display region, wherein the display region comprises the pixel circuit according to claim 1, the peripheral region comprises a first scan signal line drive circuit, a second scan signal line drive circuit, a third scan signal line drive circuit, and a light emitting control signal line drive circuit, wherein the first scan signal line drive circuit comprises multiple cascaded first scan signal line shift registers;

the second scan signal line drive circuit comprises multiple cascaded second scan signal line shift registers;

the third scan signal line drive circuit comprises multiple cascaded third scan signal line shift registers; and the light emitting control signal line drive circuit comprises multiple cascaded light emitting control signal line shift registers.

11. The display apparatus according to claim 10, wherein the peripheral region comprises a first bezel region and a second bezel region oppositely disposed on left and right sides of the display region;

the multiple first scan signal line shift registers are divided into two groups, wherein one group is distributed in the first bezel region and the other group is distributed in the second bezel region, and each first scan signal line shift register is connected with a pixel circuit in a row of sub-pixels;

the multiple second scan signal line shift registers are divided into two groups, wherein one group is distributed in the first bezel region and the other group is distributed in the second bezel region, and each second scan signal line shift register is connected with a pixel circuit in one or two rows of sub-pixels;

the multiple third scan signal line shift registers are divided into two groups, wherein one group is distributed in the first bezel region and the other group is distributed in the second bezel region, and each third scan signal line shift register is connected with a pixel circuit in one or two rows of sub-pixels;

the multiple light emitting control signal line shift registers are divided into two groups, wherein one group is distributed in the first bezel region and the other group is distributed in the second bezel region, and each light emitting control signal line shift register is connected with a pixel circuit in one or two rows of sub-pixels.

12. The display apparatus according to claim 10, wherein the peripheral region comprises a first bezel region and a second bezel region oppositely disposed on left and right sides of the display region;

the multiple first scan signal line shift registers are divided into two groups, wherein one group is distributed in the first bezel region and the other group is distributed in the second bezel region, and each first scan signal line shift register is connected with a pixel circuit in a row of sub-pixels;

the multiple second scan signal line shift registers are distributed in the first bezel region or the second bezel region, and each second scan signal line shift register is connected with a pixel circuit in one or two rows of sub-pixels;

the multiple third scan signal line shift registers are distributed in the first bezel region or the second bezel region, and each third scan signal line shift register is connected with a pixel circuit in one or two rows of sub-pixels;

the multiple light emitting control signal line shift registers are distributed in the first bezel region or the second bezel region, and each light emitting control signal line shift register is connected with a pixel circuit in one or two rows of sub-pixels.

13. The display apparatus according to claim 10, wherein the peripheral region comprises a first bezel region and a second bezel region oppositely disposed on left and right sides of the display region;

the multiple first scan signal line shift registers are distributed in the first bezel region or the second bezel region, and each first scan signal line shift register is connected with a pixel circuit in one row of sub-pixels;

the multiple second scan signal line shift registers are distributed in the first bezel region or the second bezel region, and each second scan signal line shift register is connected with a pixel circuit in one or two rows of sub-pixels;

the multiple third scan signal line shift registers are distributed in the first bezel region or the second bezel region, and each third scan signal line shift register is connected with a pixel circuit in one or two rows of sub-pixels;

the multiple light emitting control signal line shift registers are distributed in the first bezel region or the second bezel region, and each light emitting control signal line shift register is connected with a pixel circuit in one or two rows of sub-pixels.

14. A drive method of a pixel circuit, used for driving the pixel circuit according to claim 1, wherein the drive method comprises:

in a reset stage, resetting, by a first reset sub-circuit, an anode terminal of a light emitting element in response to a control signal of a second scan signal line;

in a data writing stage, writing, by a writing sub-circuit, a data voltage signal to a first electrode of a drive sub-circuit in response to a control signal of a first scan signal line;

in a light emitting stage, providing, by the drive sub-circuit, a drive current between the first electrode and a second electrode of the drive sub-circuit in response to a control signal of a first node; wherein in a low frequency display mode, an input frequency of the control signal of the first scan signal line is the same as a data refresh frequency, and an input frequency of the control signal of the second scan signal line is greater than the data refresh frequency.

* * * * *